US012676007B2

(12) United States Patent
Popov et al.

(10) Patent No.: US 12,676,007 B2
(45) Date of Patent: Jul. 7, 2026

(54) FREESPACE DETECTION USING MACHINE LEARNING FOR AUTONOMOUS SYSTEMS AND APPLICATIONS

(71) Applicant: NVIDIA Corporation, Santa Clara, CA (US)

(72) Inventors: Alexander Popov, Kirkland, WA (US); David Nister, Bellevue, WA (US); Nikolai Smolyanskiy, Seattle, WA (US); Patrik Gebhardt, Cupertino, CA (US); Ke Chen, Mountain View, CA (US); Ryan Oldja, Issaquah, WA (US); Hee Seok Lee, Seongnam-si (KR); Shane Murray, San Jose, CA (US); Ruchi Bhargava, Redmond, WA (US); Tilman Wekel, San Jose, CA (US); Sangmin Oh, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 309 days.

(21) Appl. No.: 18/366,298

(22) Filed: Aug. 7, 2023

(65) Prior Publication Data

US 2024/0096102 A1 Mar. 21, 2024

Related U.S. Application Data

(60) Provisional application No. 63/407,623, filed on Sep. 17, 2022.

(51) Int. Cl.
*G06V 20/56* (2022.01)
*G01S 13/89* (2006.01)
(Continued)

(52) U.S. Cl.
CPC .............. *G06V 20/56* (2022.01); *G01S 13/89* (2013.01); *G01S 17/89* (2013.01); *G06V 10/774* (2022.01)

(58) Field of Classification Search
CPC .... G06V 20/56; G06V 10/774; G06V 10/454; G06V 10/82; G06V 20/588; G01S 13/89; (Continued)

(56) References Cited

U.S. PATENT DOCUMENTS

| | | |
|---|---|---|
| 2005/0131646 A1 | 6/2005 | Camus |
| 2015/0363635 A1 | 12/2015 | Suri et al. |

(Continued)

OTHER PUBLICATIONS

International Search Report and Written Opinion issued in corresponding application No. PCT/2023/032671, dated Dec. 12, 2023.

*Primary Examiner* — Neil R McLean
(74) *Attorney, Agent, or Firm* — Sanders IP Law

(57) ABSTRACT

Systems and methods are disclosed that relate to freespace detection using machine learning models. First data that may include object labels may be obtained from a first sensor and freespace may be identified using the first data and the object labels. The first data may be annotated to include freespace labels that correspond to freespace within an operational environment. Freespace annotated data may be generated by combining the one or more freespace labels with second data obtained from a second sensor, with the freespace annotated data corresponding to a viewable area in the operational environment. The viewable area may be determined by tracing one or more rays from the second sensor within the field of view of the second sensor relative to the first data. The freespace annotated data may be input into a machine learning model to train the machine learning model to detect freespace using the second data.

19 Claims, 11 Drawing Sheets

(51) Int. Cl.
    *G01S 17/89*       (2020.01)
    *G06V 10/774*     (2022.01)

(58) Field of Classification Search
    CPC ........ G01S 17/89; G01S 7/417; G01S 13/931;
                                  G01S 17/931
    USPC ........................................................ 382/181
    See application file for complete search history.

(56)                References Cited

U.S. PATENT DOCUMENTS

2019/0092287 A1*   3/2019  Leach ........................ B60S 1/56
2021/0264175 A1*   8/2021  Zhang ................... G08G 1/166

* cited by examiner

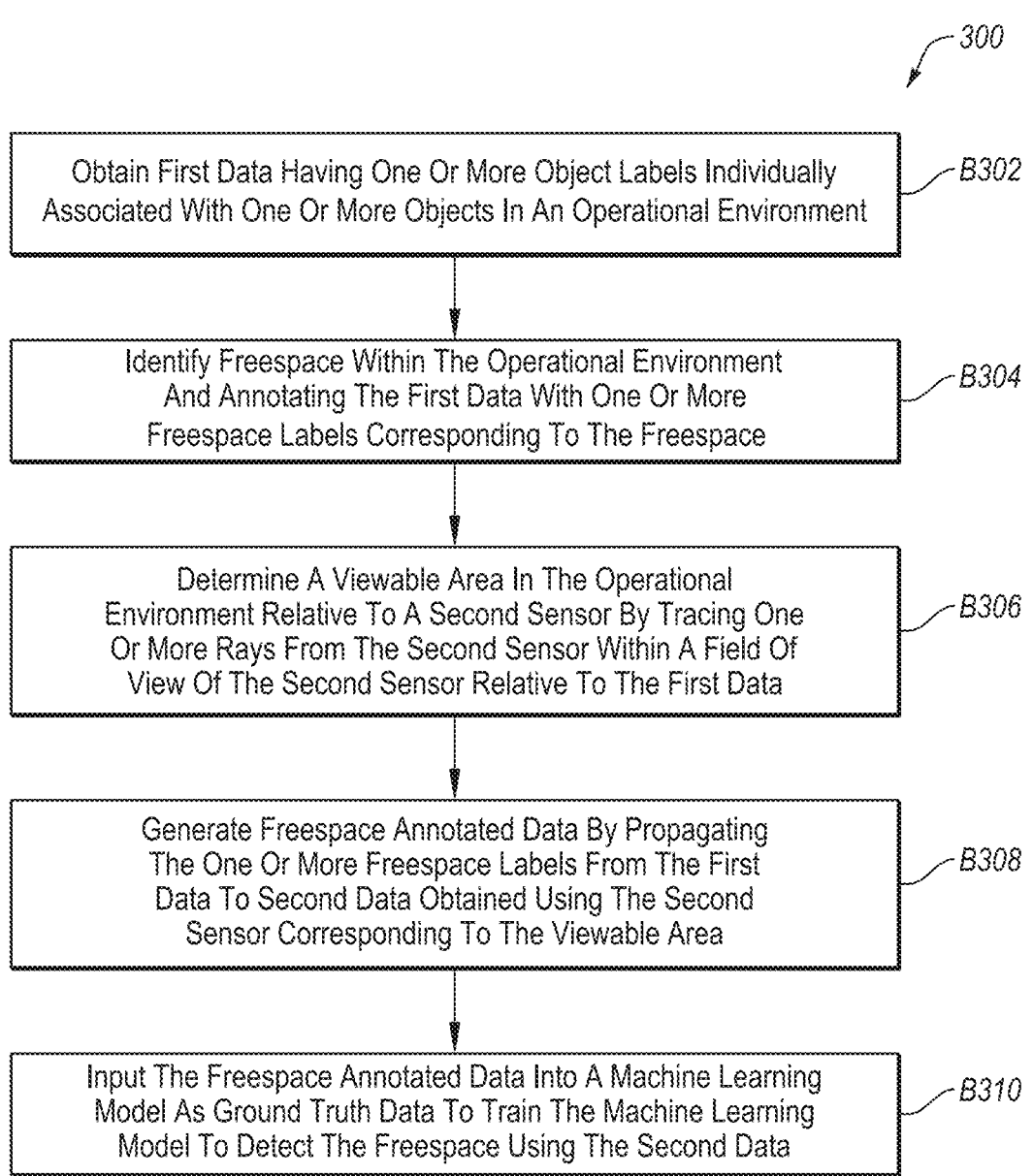

Obtain First Data Having One Or More Object Labels Individually Associated With One Or More Objects In An Operational Environment — B302

Identify Freespace Within The Operational Environment And Annotating The First Data With One Or More Freespace Labels Corresponding To The Freespace — B304

Determine A Viewable Area In The Operational Environment Relative To A Second Sensor By Tracing One Or More Rays From The Second Sensor Within A Field Of View Of The Second Sensor Relative To The First Data — B306

Generate Freespace Annotated Data By Propagating The One Or More Freespace Labels From The First Data To Second Data Obtained Using The Second Sensor Corresponding To The Viewable Area — B308

Input The Freespace Annotated Data Into A Machine Learning Model As Ground Truth Data To Train The Machine Learning Model To Detect The Freespace Using The Second Data — B310

*FIG. 3*

Server(s) 478

CPU 480(B)

CPU 480(A)

PCIe Switch 482(D)

PCIe Switch 482(C)

PCIe Switch 482(B)

PCIe Switch 482(A)

GPU 484(F)

GPU 484(H)

GPU 484(E)

GPU 484(G)

GPU 484(B)

GPU 484(D)

GPU 484(A)

GPU 484(C)

486

488

492

494

Network(s) 490

400

476

Application Layer
640

Application(s)
642

Software Layer
630

Software
632

Framework Layer
620

Job Scheduler
633

Configuration
Manager 634

Distributed File System
638

Resource Manager
636

Data Center Infrastructure Layer
610

Resource Orchestrator
612

Grouped Computing Resources
614

Node C.R.
616(1)

Node C.R.
616(2)

Node C.R.
616(N)

FREESPACE DETECTION USING MACHINE LEARNING FOR AUTONOMOUS SYSTEMS AND APPLICATIONS

CROSS-REFERENCE TO RELATED APPLICATION

This patent application claims the benefit of and priority to U.S. Provisional App. No. U.S. 63/407,623 filed Sep. 17, 2022 titled "REAL-TIME RADAR OBSTACLE AND FREE SPACE DETECTION FOR AUTONOMOUS DRIVING," which is incorporated in the present disclosure by reference in its entirety.

BACKGROUND

Autonomous machines and/or semi-autonomous machines (e.g., ego-machines) often use various sensors in association with navigating through an operational environment. In some circumstances, the operational environment may vary based on the ego-machine, where the ego-machine may perform driving operations, flying operations, boating operations, and/or any other navigation that may use sensor data in the furtherance thereof. The ego-machine may use one or more of a variety of sensors to perform navigation operations, where the sensors may include LiDAR devices, RADAR devices, camera devices, infrared devices, and/or other sensing and/or ranging devices. In general, the ego-machine may utilize the sensors to determine relative locations of objects around the ego-machine within the operational environment and may determine navigation decisions relative to the detected objects.

In some traditional implementations, many sensors and/or high precision sensors may be implemented on an ego-machine to improve the performance and/or accuracy of the navigation of the ego-machine by detecting freespace (which may include space at which the ego-machine may navigate) within the operational environment. For example, one or more LiDAR devices, one or more RADAR devices, and/or one or more camera devices may be included in an ego-machine and may be used to contribute to the identification of freespace and corresponding navigation of the ego-machine through the operational environment.

In some circumstances, high precision sensors may produce large amounts of data that may be slow to process and/or the high precision sensors may be prohibitively expensive to include on many ego-machines and/or other vehicles. For example, a processing device with advanced speed, memory, etc., may be used in association with data produced using a LiDAR device and/or a LiDAR device may cost significantly (e.g., prohibitively) more than another sensing device, such as a RADAR device. Alternatively, or additionally, some high precision sensors may include limitations under various circumstances, such as inclement weather and/or poor lighting. For example, a camera device may have reduced effectiveness in low light situations where less data corresponding to the operational environment may be obtained. As such, traditional implementations of ego-machine navigation using one or more sensors to detect freespace may cost a significant amount, which may cause traditional implementations to inaccessible to many operators of the ego-machine.

SUMMARY

Embodiments of the present disclosure relate to applications and systems for training and deploying a machine learning ("ML") model (e.g., a neural network) for freespace identification. For example, in some embodiments, the ML model may be trained using training data that may be generated using one or more sensors associated with navigation of an ego-machine. In some embodiments, the training data may include one or more labels associated with an operational environment (e.g., including objects and/or freespace within the operational environment) that may be identified relative to first data generated using a first sensor (e.g., LiDAR data) and the labels may be propagated from the first data to second data that may be generated using a second sensor (e.g., RADAR data).

For instance, systems and methods are disclosed that relate to obtaining the first data and identifying freespace within the operational environment based at least on the first data, in which the freespace may relate to one or more portions of the operational environment that may be navigable by the ego-machine. In these and other embodiments, the first data may be annotated with one or more freespace labels corresponding to the identified freespace. Further, the second data may be obtained. The second data may correspond to a same area as the first data. Alternatively, or additionally, the second data may have been generated at the same or similar time as the first data. The freespace labels may be propagated from the first data to the second data, relative to a viewable area of the second sensor and based at least on an alignment between the first data and the second data. The combination of the second data and the freespace labels may be input to the ML model such that the ML model may be trained to detect freespace within an operational environment using the second data. As such, the ML model may be able to use data of the same type of the second data, which may be sparse relative to data of the same type as the first data, to identify freespace within an operational environment when the data type of the second data may have traditionally been individually insufficient for freespace identification. As such, systems and methods disclosed in the present disclosure may help facilitate navigation using the data type corresponding to the second data, which may be less expensive and/or require less computational expense than using the data type corresponding to the first data.

BRIEF DESCRIPTION OF THE DRAWINGS

The present systems and methods for freespace detection using machine learning for autonomous or semi-autonomous systems are described in detail below with reference to the attached drawing figures, wherein:

FIG. 3 illustrates a method for freespace detection using an ML model, according to one or more embodiments of the present disclosure;

DETAILED DESCRIPTION

Figure 1A:
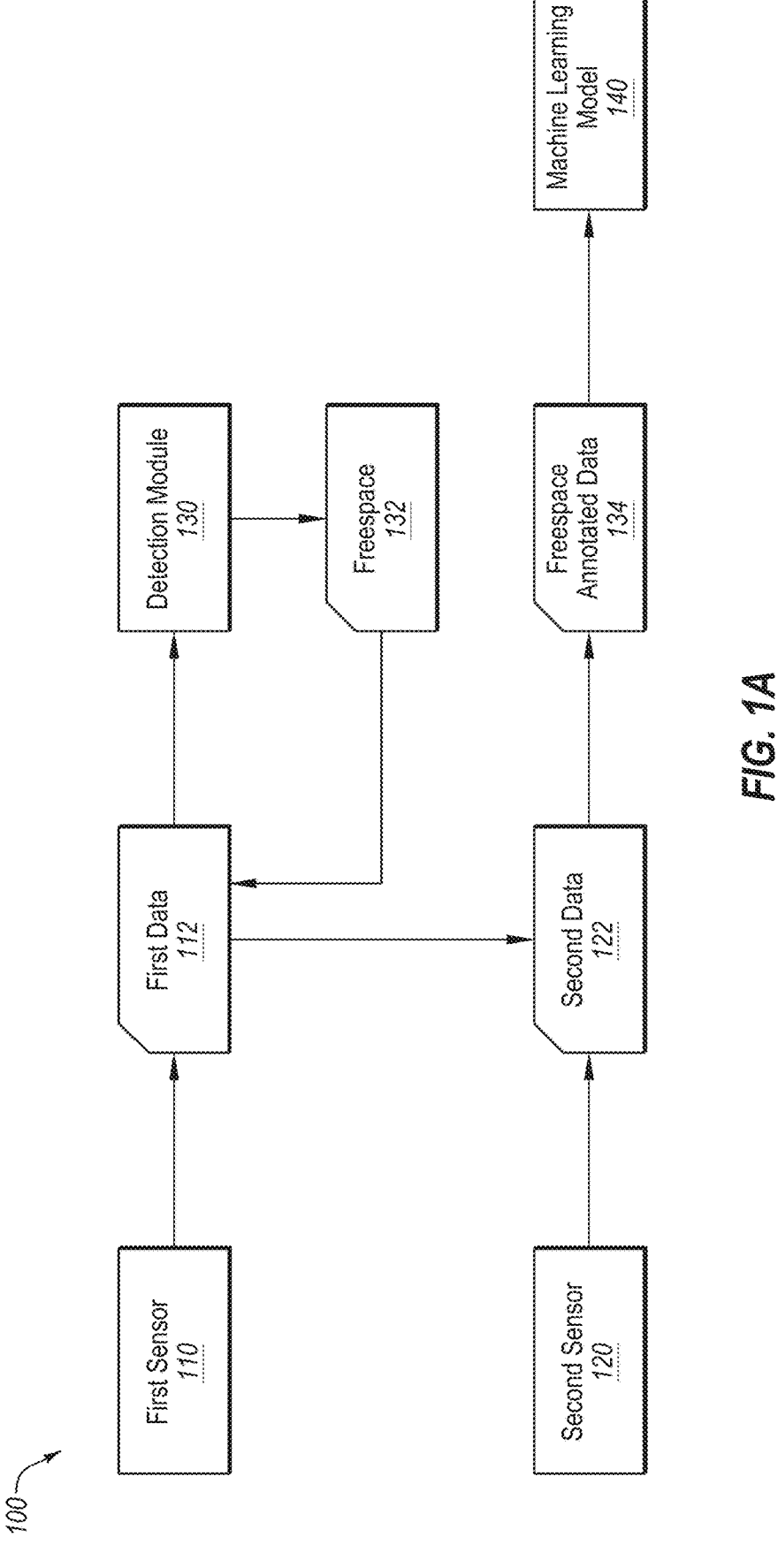
FIG. 1A illustrates an example system configured for freespace detection using an ML model, according to one or more embodiments of the present disclosure.

Systems and methods disclosed herein may relate to freespace detection using a machine learning ("ML") model. In some embodiments, the freespace detection may correspond to one or more ego-machines, which may include any applicable machine or system that is capable of performing one or more autonomous and/or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous or semi-autonomous vehicle or machine 300 (alternatively referred to herein as "vehicle 300" or "ego-machine 300) described with respect to FIGS. 3A-3D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

Alternatively, or additionally, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs) that may process text, audio, and/or image/sensor data to generate one or more outputs, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

Autonomous machines and/or semi-autonomous machines (hereinafter "ego-machines") use one or more various sensors to obtain data relative to the surroundings of the ego-machine. In some circumstances, the ego-machine may use the data to contribute to and/or perform navigation functions in an operational environment in which the ego-machine is configured to operate.

In a complex operational environment (e.g., an operational environment that may include multiple static and/or dynamic objects in proximity to or along a path of the ego-machine), additional sensors may be included in conjunction with the ego-machine to aid in navigating the complex operational environment. In some instances, the additional sensors may include greatly increased costs (e.g., the additional sensors may be individually expensive) and/or may introduce an increasing amount of computational complexity (e.g., the additional sensors may individually add computational complexity to the ego-machine, which may compound with additional sensors). In some circumstances, the inclusion of the additional sensors may increase the cost and/or the computational complexity associated with the ego-machine such that the benefit of the additional sensors may not be realized. For example, increasing the computational complexity associated with the ego-machine may result in a processing time that may limit a navigation speed of the ego-machine (e.g., the computational complexity from the additional sensors adds an amount of processing that may limit how fast the ego-machine may travel). In another example, increasing the costs via the additional sensors may drive the cost of the ego-machine to an unfeasible price point.

In some circumstances, some sensors (which may include one or more additional sensors) may include one or more limitations, such as instances in which the sensors perform at a lower function than at other times. For example, some sensors may experience limited performance in some circumstances, such as during inclement weather, during night or lowlight conditions, and/or in the presence of many occlusions. Some sensors may have better performance than other sensors in various circumstances, such that it may be beneficial to combine sensors to obtain improved data that may be used by the ego-machine, such as for navigation purposes. For example, an ego-machine may include a camera device, a LiDAR device, and/or a RADAR device such that the sensors may obtain data in various circumstances. In the example, the camera device may not be suited to obtain data in lowlight conditions while the LiDAR device and/or the RADAR device may be suited to obtain data in the lowlight conditions.

In some circumstances, it may be beneficial to reduce the number of sensors that may be used with an ego-machine (e.g., to reduce computational complexity, power consumption, costs, etc.) that may be used in conjunction with navigation associated with the ego-machine. In such instances, a sensor that may be functional in various circumstances may be selected and/or adaptations to the sensor may be introduced to improve the performance of the sensor and/or data produced therefrom. For example, the data generated using a sensor associated with an ego-machine may be input into an ML model (e.g., a deep neural network (DNN)) and the ML model may make determinations about the operational environment relative to the ego-machine based on the data generated using the sensor.

In some circumstances, data generated using a sensor that may be input into the ML model may be sparse (e.g., sparse data may not include ample information for the ML model to make determinations relative to the operational environment associated with an ego-machine, including during operation of the ego-machine). For example, in instances in which the sensor is a RADAR device, the ML model, using RADAR device data as an input, may have difficulty identifying and/or classifying moving objects (e.g., other automobiles in motion), bicycles, pedestrians, obstacles in the road, etc., when individually using the RADAR device data. In general, the ML model may experience difficulty in identifying freespace (e.g., area around the ego-machine and/or within the operational environment that may be a navigable option for the ego-machine) when limitedly trained and/or trained using a single type of sensor.

By contrast, in some embodiments of the present disclosure, other sensors that are not RADAR devices (e.g., LiDAR devices, stereo camera devices, ultrasound devices, etc.) may be configured to generate sensor data, which sensor data may be improved relative to the RADAR device data under the same or similar circumstances. For example, at a first time and/or a first location, RADAR device data and LiDAR device data may be obtained relative to an operational environment and the LiDAR device data may include improved data and/or more complete data (e.g., not sparse, where non-sparse data includes ample information for the ML model to make determinations relative to the operational environment) relative to the operational environment compared to the RADAR device data. In these or other embodiments, one or more other sensors than a RADAR device may obtain improved data and/or more complete data relative to a RADAR device, which data may be used to identify portions of the operational environment (e.g., freespace labels corresponding to the freespace) that may be combined with the RADAR device data and may be used to train the ML model associated with an ego-machine, such that the ego-machine may use the RADAR data to detect objects based on a recognition of the objects using the improved data, as described herein.

In some embodiments of the present disclosure, freespace within the operational environment may be identified using the first data. As indicated in the present disclosure, the freespace may correspond to one or more areas around the ego-machine and/or within the operational environment that may be a navigable option for the ego-machine. In these and other embodiments, the first data may be annotated with one or more freespace labels that may correspond to the identified freespace.

In some embodiments of the present disclosure, the annotation of the one or more freespace labels to the first data may provide a current status corresponding to the freespace within the operational environment relative to the ego-machine. The current status associated with the one or more freespace labels may include a visibility status and/or an occupancy status. For example, the freespace labels may include at least "observed and free", "observed and occupied", "partially observed", and/or "unobserved". In these or other embodiments, the freespace labels may be determined and/or annotated based on the first data (e.g., LiDAR data) in view of another sensor device (e.g., a RADAR device), as described herein.

In these or other embodiments, the first data (e.g., the LiDAR data) may be annotated with the freespace labels to obtain annotated LiDAR data, where the annotated LiDAR data may include the freespace labels associated with the freespace within the operational environment. In some embodiments, the first data may be sensor data generated using one or more LiDAR devices included in the ego-machine that may generate non-sparse (or less sparse, or denser) data. As such, the annotated LiDAR data may be non-sparse sensor data generated using the one or more LiDAR devices that may include freespace labels associated with the freespace in the operational environment, as described herein.

In some embodiments, the freespace labels included in the annotated LiDAR data may be propagated to the RADAR data such that the RADAR data may include the freespace labels, indicating at least the freespace within the operational environment. For example, the RADAR data generated using at least one RADAR device may be annotated with the freespace labels from the annotated LiDAR data (e.g., the LiDAR data generated using at least one LiDAR device and including the freespace labels) to obtain freespace annotated data. The freespace labels included in the freespace annotated data may be the same or similar as the freespace labels included in the annotated LiDAR data, where the freespace annotated data may be associated with different sensors than the annotated LiDAR data (e.g., RADAR devices vs. LiDAR devices).

In these or other embodiments, the freespace annotated data (e.g., which may be data generated using the RADAR devices and may include the freespace labels associated with the freespace in the operational environment and/or other portions of the operational environment) may be input into an ML model where the freespace annotated data may be used as training data for the ML model, and where the ML model may be used in conjunction with navigation of the ego-machine. For example, in instances in which an ego-machine includes a RADAR device, a LiDAR device, a camera device, and/or other sensor devices, an ML model associated with the navigation of the ego-machine may be trained using data generated using the RADAR device, and the RADAR data may be annotated with one or more freespace labels that may be obtained using the LiDAR device, the camera device, and/or the other sensor devices.

In these or other embodiments, the ML model may be trained using the freespace annotated data where the freespace annotated data may include one or more freespace labels that may identify freespace within the operational environment. In some embodiments, the freespace annotated data may be associated with RADAR data generated using a RADAR device that may produce sparse data relative to LiDAR data generated using a LiDAR device that may produce non-sparse data (or relatively denser data). As part of the propagation of the freespace labels from the annotated LiDAR data (as described herein) to the second data (e.g., the RADAR data generated using the RADAR device), the freespace annotated data may include the same or similar accuracy as the LiDAR data relative to the freespace within the operational environment, as the freespace labels in the freespace annotated data may have propagated from the annotated LiDAR data.

In some embodiments, the ML model may determine the freespace (and/or other aspects relative to an operational environment including other objects and actions associated with the objects) within an operational environment associated with an ego-machine by identifying similarities in operational environment data, obtained relative to the operational environment and generated by a RADAR device, with the freespace annotated data (e.g., generated by a RADAR device and/or annotated with the freespace labels). In some embodiments, the ML model may use the freespace annotated data (e.g., RADAR data annotated with the freespace labels) that may be sparse data and may determine the freespace within the operational environment based on the training described herein.

In these or other embodiments, the ML model may be trained on the freespace annotated data that includes the freespace labels propagated from the annotated LiDAR data such that the ML model may obtain RADAR data generated using a RADAR device and may identify objects and/or freespace within an operational environment. As such, the ML model may contribute to navigation of an ego-machine using sensors (e.g., one or more RADAR devices) and/or sensor data (e.g., RADAR data) that may be less expensive and/or more compact, respectively, such that the navigation may be accomplished at a lower cost and/or with the sensors that may be more readily available and/or present in vehicles compared to other sensors (e.g., LiDAR devices).

Referring now to FIG. 1A, FIG. 1A illustrates an example system 100 for freespace detection using an ML model, according to one or more embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed using entities may be carried out using hardware, firmware, and/or software. For instance, various functions may be carried out using a processor executing instructions stored in memory.

In some embodiments, the system 100 may include a first sensor 110, a second sensor 120, a detection module 130, and an ML model 140. In some embodiments, the ML model 140 may be trained, as described herein, and subsequently implemented in an operational environment where the ML model 140 may detect freespace in the operational environment using sensor data generated using a sensor that may traditionally generate sparse sensor data. In these and other embodiments, the ML model 140 may be trained using one or more labels propagated from non-sparse sensor data to the sparse sensor data, such that the ML model 140 may use the one or more labels associated with the sparse sensor data to detect the freespace in the operational environment when the sparse sensor data may traditionally fail to include sufficient detail for a traditional system (e.g., a traditional ML model) to make similar determinations. In the present disclosure, the term "sparse data" may refer to data that may be difficult for ML models to make determinations relative to the operational environment associated with an ego-machine. Similarly, reference to "non-sparse data" may include data that may include much more information to more easily allow ML models to make determinations relative to the operational environment. For example, RADAR data may be an example of sparse data and LiDAR data may be an example of non-sparse data.

In some embodiments, the first sensor 110 may be one or more devices that may generate first data 112, where the first data 112 may include a first resolution metric and/or a first quality metric. In some embodiments, the first data 112 may be considered non-sparse sensor data (or dense sensor data) where non-sparse sensor data may refer to data that may include a greater resolution metric and/or improved quality metric relative to sparse sensor data. Alternatively, or additionally, the non-sparse sensor data may be used to generate an improved 2D and/or 3D representation of an operational environment and/or objects included in the operational environment relative to a 2D and/or 3D representation using sparse sensor data. For example, the first sensor 110 may include a LIDAR device and the first data 112 may be a LiDAR point cloud which may have an improved resolution metric and/or quality metric relative to a RADAR device and/or associated RADAR data generated using the RADAR device. Alternatively, or additionally, the first sensor 110 may include multiple sensors and the individual data generated using the individual sensors may be combined into the first data 112. In such instances, the first sensor 110 may include multiple sensors of the same type (e.g., multiple LiDAR devices) and/or the first sensor 110 may include one or more sensors of different types (e.g., a LiDAR device and a camera device). In general, the first sensor 110 may be referred to as a singular device but may include multiple devices unless explicitly stated otherwise.

In some embodiments, the first sensor 110 may be coupled to an ego-machine such that the first sensor 110 may be used to generate the first data 112 as the ego-machine navigates the operational environment. In such instances, the first sensor 110 may convert the first data 112 to be in a rig coordinate frame, where the rig coordinate frame may be associated with the ego-machine. For example, the origin of the rig coordinate frame may be a center point of the ego-machine and may be used as a reference point for other data relative to the ego-machine, as described herein.

In some embodiments, the first data 112 may include objects and/or features included in the operational environment. For example, the first data 112 may include a capture of one or more vehicles, buildings, curbs, pedestrians, construction equipment, and/or other objects using the first sensor 110 that may be included in the operational environment associated with the system 100 of the ego-machine. In some embodiments, objects included in the first data 112 may be detected and/or may include an associated object label that may identify the corresponding object. For example, a detected automobile (e.g., a first object) may include an automobile label identifying the first object as an automobile. In these and other embodiments, detection of an object included in the first data 112 may be performed automatically, such as using one or more object detection techniques.

In some embodiments, the detection module 130 may be configured to perform the object detection relative to the objects included in the first data 112 and/or the detection module 130 may annotate the first data 112 to include one or more object labels that may be individually associated with the detected objects. For example, the detection module 130 may obtain the first data 112 and may detect a first object and a second object. The detection module 130 may determine the first object to be an automobile and the second object to be a pedestrian and the detection module 130 may annotate the first data 112 such that the first object includes an automobile label and/or the second object includes a pedestrian label.

In general, the first data 112 may include still images of the operational environment and/or the objects included in the operational environment (e.g., an image of the operational environment as a particular point in time and/or of a particular portion of the operational environment). In some embodiments, the first data 112 may include temporal data and/or spatial data that may be used to align the first data 112 with other data, as described herein. For example, a time stamp that may correspond to a time when the first data 112 may be generated by the first sensor 110, where the time stamp may be temporal data associated with the first data 112. For example, a first portion of the first data 112 may be generated using the first sensor 110 at a first time and a first time stamp corresponding to the first time may be associated with the first portion of the first data 112. In another example, the first portion of the first data 112 may include position and/or orientation information (e.g., position data generated by a GPS device, an accelerometer, a gyroscope and/or other inertial navigation devices and/or systems), where the position and/or orientation information may be spatial data associated with the first portion of the first data 112.

In some embodiments, the time stamp may be associated with a single clock device, such that other data that may include a time stamp may use the single clock device and may have a common reference point (e.g., second data 122 may be obtained using the second sensor 120 and may include an associated time stamp generated using the single clock device, as described herein). For example, the system 100 and/or the ego-machine may include a clock device that may be a common reference for time stamps that may be associated with the first data 112, the second data 122, and/or other data or operations that may include a time reference. In general, the temporal data and/or the spatial data associated with the first data 112 may be used to align the first data 112 with other data, such as the second data 122, as described herein.

In some embodiments, the second sensor 120 may be one or more devices that may generate the second data 122, where the second data 122 may include a second resolution metric and/or a second quality metric. In some embodiments, the second resolution metric may be less than the first resolution metric and/or the second quality metric may be less than the first quality metric. In some embodiments, the second data 122 may be considered sparse sensor data where sparse sensor data may refer to data that may include a lesser resolution metric and/or decreased quality metric relative to non-sparse sensor data, as described herein. For example, the second sensor 120 may include a RADAR device and the second data 122 may be RADAR data which may have a decreased resolution metric and/or quality metric relative to a LiDAR device and/or associated LiDAR data (e.g., the first sensor 110 and/or the first data 112, respectively). Alternatively, or additionally, the second sensor 120 may include multiple sensors and the individual data corresponding to the individual sensors may be combined into the second data 122. In such instances, the second sensor 120 may include multiple sensors of the same type (e.g., multiple RADAR devices). In general, the second sensor 120 may be referred to as a singular device but may include multiple devices unless explicitly stated otherwise.

In some embodiments, the second sensor 120 may be coupled to an ego-machine such that the second sensor 120 may generate the second data 122 as the ego-machine navigates the operational environment. In such instances, the second sensor 120 may convert the second data 122 to be in a rig coordinate frame, where the rig coordinate frame may be associated with the ego-machine. For example, the origin of the rig coordinate frame may be a center point of the ego-machine (or a center point of an axle, such as a rear axle, of the ego-machine) and may be used as a reference point for other data relative to the ego-machine, as described herein. In some embodiments, the second sensor 120 may be configured to obtain data from any angle relative to the origin (e.g., 360 degrees relative to a bird's eye view of the origin). For example, the second sensor 120 may include multiple sensors that may be disposed around the ego-machine such that the second data 122 may be generated for any angle (e.g., 360 degrees) relative to the ego-machine by combining the second data 122 generated using individual sensors included in the second sensors 120.

In some embodiments, the second data 122 may include objects and/or features included in the operational environment. For example, the second data 122 may include a capture of one or more vehicles, buildings, curbs, pedestrians, construction equipment, and/or other objects that may be included in the operational environment associated with the system 100 of the ego-machine. In some embodiments, objects included in the second data 122 may be detected and/or may include an associated object label that may identify the associated object, that may be the same or similar as the object labels associated with the first data 112. Alternatively, or additionally, some or all of the second data 122 may include a decreased resolution metric and/or decreased quality metric relative to the first data 112, such that some objects included in the second data 122 may not be identifiable and/or may not have object labels associated therewith.

In general, the second data 122 may include still images of the operational environment and/or the objects included in the operational environment (e.g., an image of the operational environment as a particular point in time and/or of a particular portion of the operational environment). In some embodiments, the second data 122 may include temporal data and/or spatial data that may be used to align the second data 122 with other data, such as the first data 112, as described herein. For example, a time stamp that may correspond to a time when the second data 122 may be generated by the second sensor 120, where the time stamp may be temporal data associated with the second data 122. For example, a first portion of the second data 122 may be generated using the second sensor 120 at a first time and a first time stamp corresponding to the first time may be associated with the first portion of the second data 122. In another example, the first portion of the second data 122 may include position and/or orientation information (e.g., position data obtained using a GPS device, an accelerometer, a gyroscope and/or other inertial navigation devices and/or systems and/or obtained by performing any suitable localization technique), where the position and/or orientation information may be spatial data associated with the first portion of the second data 122.

In some embodiments, the time stamp may be associated with a single clock device, such that other data that may include a time stamp may use the single clock device and may have a common reference point (e.g., the first data 112 may include an associated time stamp generated using the single clock device, as described herein), such as the clock device that may be included in the system 100 and/or the ego-machine, as described herein. In some embodiments, the first data 112 and the second data 122 may be obtained at substantially the same time, such that in instances in which it may be beneficial to align the first data 112 and the second data 122, the first data 112 and the second data 122 may exist for any particular time. In general, the temporal data and/or the spatial data associated with the second data 122 may be used to align the second data 122 with other data, such as the first data 112, as described herein.

In some embodiments, the detection module 130 may perform object detection relative to the first data 112 and/or the second data 122, as described herein. Alternatively, or additionally, the detection module 130 may perform freespace detection relative to the first data 112 and/or the second data 122. The freespace may include one or more areas that may be adjacent to the ego-machine, near the ego-machine, and/or disposed within the operational environment associated with the ego-machine, where the freespace may be a navigable option for the ego-machine through the operational environment.

In some embodiments, the detection module 130 may include code and routines configured to allow one or more computing devices to perform one or more operations. Additionally, or alternatively, the detection module 130 may be implemented using hardware including one or more processors, central processing units (CPUs), graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators), and/or other processor types. In some other instances, the detection module 130 may be implemented using a combination of hardware and software. In the present disclosure, operations described as being performed using the detection module 130 may include operations that the detection module 130 may direct a corresponding system to perform.

In some embodiments, the detection module 130 may annotate the detected freespace with one or more freespace labels where the freespace labels may correspond to and/or indicate the freespace within the operational environment with respect to the first data 112. Alternatively, or additionally, the freespace labels may correspond to portions of the operational environment that may be determined to be non-freespace (e.g., occupied portions of the operational environment, which may include one or more objects within the operational environment). In some embodiments, the freespace labels may be automatically determined and/or annotated to the first data 112. For example, the detection module 130 may detect a first navigable space within an operational environment included in the first data 112 where the first navigable space may not include a detected object (e.g., another vehicle, a pedestrian, etc.), and the detection module 130 may annotate the first data 112 with a freespace label associated with the first navigable space.

Alternatively, or additionally, the freespace labels generated using the detection module 130 may be reviewed, confirmed, and/or adjusted by a user. For example, the user may review the freespace labels generated using the detection module 130 with respect to the first data 112 and may confirm the freespace labels correspond with the freespace in the operational environment and/or correspond to occupied portions of the operational environment (e.g., as described herein, the freespace labels may correspond to occupied, free, partially observed, and/or unobserved portions of the operational environment). In another example, the user may review the freespace labels generated using the detection module 130 with respect to the first data 112 and the user may adjust the location of one or more of the freespace labels within the operational environment which may result in the freespace labels more accurately indicating a corresponding portion of the operational environment, such as the freespace and/or an occupied portion of the operational environment.

Alternatively, or additionally, the user may manually annotate the first data 112 to include one or more freespace labels associated with the first data 112. For example, the user may review the first data 112 and the user may identify the freespace included in the first data 112. The user may annotate the first data 112 to include one or more freespace labels corresponding to various portions of the operational environment as identified by the user. In these and other embodiments, the freespace labels may indicate portions of the operational environment represented by the first data 112 that may be associated with freespace, occupied portions, partially observed, and/or unobserved portions of the operational environment, relative to the ego-machine.

In some embodiments, the one or more freespace labels identified in the first data 112 may be propagated to the second data 122. For example, the detection module 130 may direct the propagation of the freespace labels included the first data 112 to the second data 122. In some embodiments, freespace annotated data 134 may be a combination of the freespace labels associated with the first data 112 and the second data 122. For example, the freespace annotated data 134 may include the second data 122 and the freespace labels propagated from the first data 112, as described herein.

In some embodiments, the freespace labels may be propagated from the first data 112 to the second data 122 in view of a viewable area relative to the second sensor 120. For example, a first portion of the freespace labels including a first visibility status may be propagated from the first data 112 to the second data 122 corresponding to a portion of the operational environment that may be viewable relative to the second sensor 120 and a second portion of the freespace labels including a second visibility status may be propagated from the first data 112 to the second data 122 corresponding to a portion of the operational environment that may be unviewable to the second sensor 120. In these and other embodiments, the viewable area relative to the second sensor 120 may be determined by tracing one or more rays in the operational environment extending from the second sensor 120 and relative to the first data 112. For example, subsequent to the first sensor 110 obtaining the first data 112, the detection module 130 may direct one or more rays to be traced from the second sensor 120 relative to the first data 112 to determine a portion of the operational environment that may be viewable by the second sensor 120 (e.g., the viewable area).

In some embodiments, the detection module 130 may determine a current status of one or more portions of the operational environment based on the first data 112 generated using the first sensor 110 in view of the second sensor

120 and/or the detection module 130 may determine one or more freespace labels that may be based on the current status. For example, the first sensor 110 may generate a greater amount of data (e.g., which may include more visibility) within the operational environment relative to the second sensor 120 (e.g., a greater range from the ego-machine, around and/or past objects in the operational environment, etc.). In such instances, the freespace labels identified relative to the first data 112 may be less useful and/or not applicable to some portions of the second data 122 as portions of the operational environment associated with the freespace labels may be unobserved and/or undetected using the second sensor 120. In these and other embodiments, the current status may include one or more of a visibility status and an occupancy status, where the visibility status may be relative to the second sensor 120.

In some embodiments, the visibility status of the operational environment (e.g., as included in the first data 112), relative to the second sensor 120, may include at least observed, unobserved, and/or partially observed. Alternatively, or additionally, the occupancy status of the operational environment (e.g., as included in the first data 112) may include at least occupied, free, and/or undetermined. In some embodiments, the current status may include a combination of the visibility status and the occupancy status. For example, a first current status of the freespace labels may be "observed and free," a second current status may be "observed and occupied," a third current status may be "partially observed," and a fourth current status may be "unobserved." Alternatively, or additionally, the freespace labels may be named corresponding to the current status thereof. For example, the freespace labels may be observed and free, observed and occupied, partially observed, and/or unobserved.

In instances in which the freespace label is one of partially observed and/or unobserved, the associated occupancy status may be undetermined. In these and other embodiments, the visibility status may be relative to the second sensor 120 in view of the first data 112. For example, the first data 112 may include a first particular portion and a second particular portion (e.g., where both the first particular portion and the second particular portion may be observed using the first sensor 110) and the detection module 130 may determine the first particular portion to be observed using the second sensor 120 and the second particular portion to be unobserved (or partially observed) using the second sensor 120, such as using ray tracing and/or other determinations described herein.

Figure 1B:
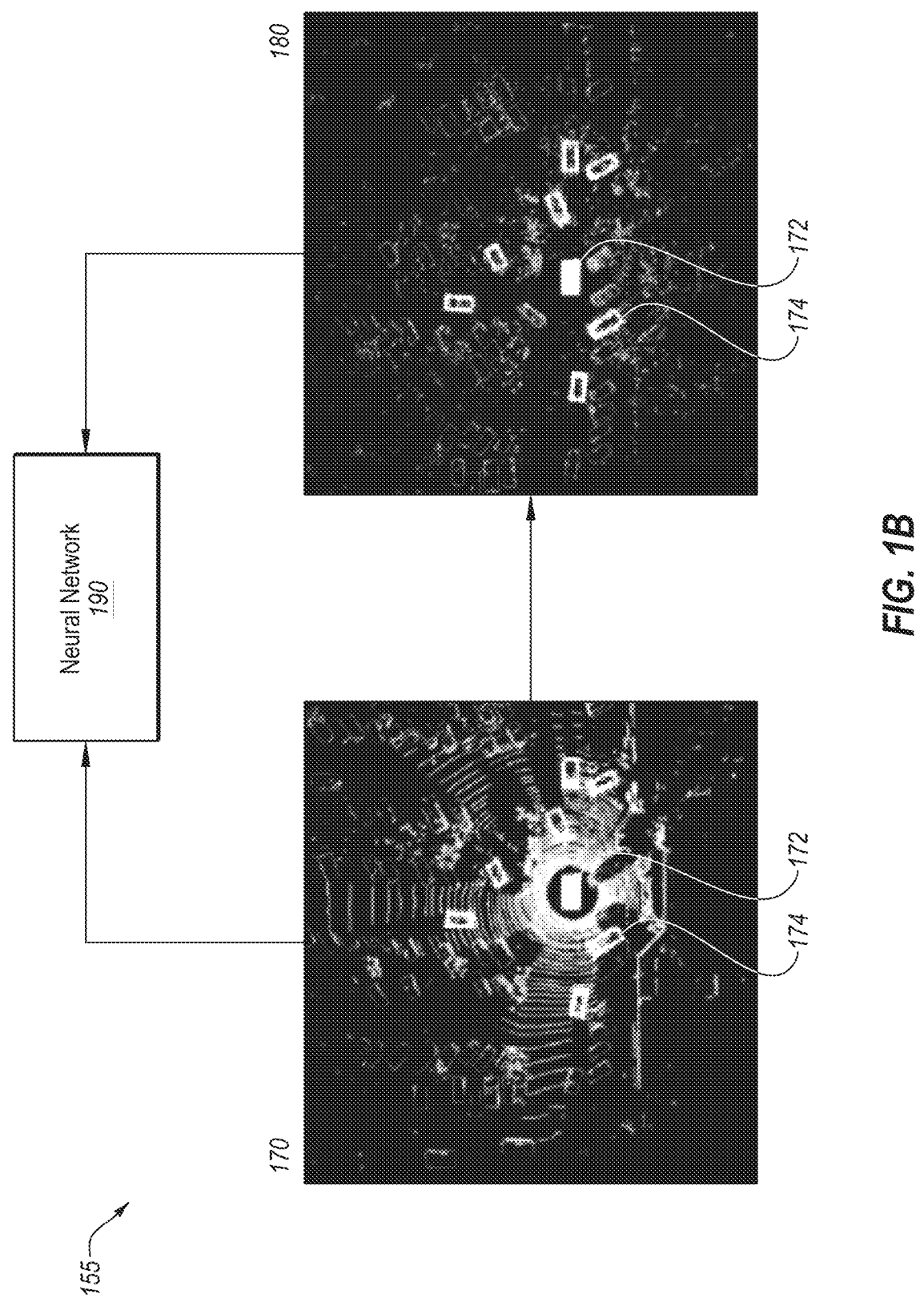
FIG. 1B illustrates an example depiction of propagating bounding box labels corresponding to different sensor data, in accordance with one or more embodiments of the present disclosure.

FIG. 1B illustrates an environment 155 for propagating bounding box labels 174 corresponding to different sensor data, in accordance with one or more embodiments of the present disclosure. It should be understood that this and other arrangements described herein are set forth only as examples. Other arrangements and elements (e.g., machines, sensors, neural networks, machine learning models, etc.) may be used in addition to or instead of those described, and some elements may be omitted altogether. Various functions described herein may be carried out using hardware, firmware, and/or software. For instance, various functions may be carried out using a processor executing instructions stored in memory.

In some embodiments, the environment 155 for propagating one or more bounding box labels may include data generated using a first sensor type that may result in a first representation 170 of an operational environment. In some embodiments, the first representation 170 of the operational environment may include a top-down bird's eye view of one or more LiDAR scans corresponding to the operational environment.

More particularly, in some embodiments, the first representation 170 may depict LiDAR scans originating from one or more points central to the operational environment. For example, the operational environment may include an area surrounding an ego-machine 172 where the one or more LiDAR scans may include data corresponding to one hundred "100" meters in all directions with respect to the ego-machine at a particular point in time. Additionally or alternatively, the first representation 170 may depict one or more other areas with respect to the ego-machine 172. For example, the data may correspond to an area extending outward with respect to the ego-machine in one direction (e.g., in front of the ego-machine, behind the ego-machine, outward from one or more sides of the ego-machine, etc.).

In some embodiments, the LiDAR scans may generate data that may indicate that one or more objects and/or obstacles may be present in the operational environment corresponding to the ego-machine 172. For example, the objects and/or obstacles may include one or more other ego-machines, pedestrians, curbs, buildings, medians, and other objects that may be within the operational environment of the ego-machine 172.

In some embodiments, the data corresponding to the one or more LiDAR scans may be annotated to include one or more labels corresponding to objects and/or obstacles in the operational environment. In particular, the data corresponding to the one or more LiDAR scans may be annotated using one or more known data patterns corresponding to one or more known objects. Additionally or alternatively, the data corresponding to the one or more LiDAR scans may be annotated manually where the one or more objects and/or obstacles may be identified using one or more individuals, entities, systems, modelling techniques etc. In some embodiments, the annotations corresponding to the LiDAR may include respective bounding boxes 174 corresponding to one or more objects included in the operational environment, where the one or more bounding boxes may indicate an estimated position corresponding to respective objects based on the LiDAR data.

In some embodiments, the annotated data including the one or more bounding boxes 174 corresponding to the one or more LiDAR scans may be used to train a neural network 190 to recognize objects and corresponding bounding boxes—e.g., bounding boxes 174. In some embodiments, the annotated data may be used as ground truth that may be used to train the neural network 190 to identify one or more objects corresponding to the operational environment with respect to the ego-machine 172.

In some embodiments, the neural network 190 may additionally be trained to recognize objects corresponding to sensor data that may be more sparse as compared to the data generated using the one or more LiDAR scans. For example, the neural network 190 may be trained to recognize objects based on RADAR data. Given that, in some instances, RADAR data may be more sparse than data corresponding to LiDAR scans, the annotations associated with LiDAR scans may be used to generate training data for the neural network 190 to recognize objects based on the comparatively sparse RADAR data. In some embodiments, the training data generated using RADAR data may be represented visually by a second representation 180 of the operational environment.

In some embodiments, the second representation 180 of the operational environment may be a visual representation of RADAR data collected and/or generated using one or more RADAR sensors corresponding to the ego-machine 172. In some embodiments, the RADAR data corresponding to the second representation 180 may be collected at the same time, or substantially the same time, as the LiDAR data used to generate the first representation 170 corresponding to the operational environment.

In some embodiments, the bounding boxes 174 corresponding to objects that may have been detected using the data corresponding to LiDAR scans may be used to annotate the RADAR data corresponding to the second representation 180. In some embodiments, the bounding boxes 174 may be mapped onto the second representation 180 corresponding to RADAR data. In particular, due to the area corresponding to the operational environment in the first representation 170 being substantially the same in the second representation 180 and the time in which the RADAR data may be generated using one or more RADAR sensors may be the same or substantially the same as the data generated using one or more LiDAR scans, the bounding boxes 174 may be used to indicate objects in the operational environment corresponding to the RADAR data. In some embodiments, mapping bounding boxes 174 onto the second representation 180 may serve as a training mechanism used to train the neural network 190 to identify objects using RADAR data.

In some embodiments, one or more labels corresponding to bounding boxes 182 may be filtered out based on a number of RADAR detections corresponding to an object being below a particular threshold. In some embodiments, the particular threshold may be determined based on one or more heuristic analyses. For example, it may be determined that an accuracy corresponding to object identification may increase based on the number of RADAR detections exceeding a particular number, e.g., 3, 4, 5, 6, or another discrete number of RADAR detection points corresponding to a particular bounding box based on RADAR data corresponding to the operational environment.

In some embodiments, the neural network 190 may include one or more neural networks, DNNs, machine learning models, machine learning systems, and other learning models that may be trained to identify one or more objects in the operational environment based on sensor data. Further, the neural network 190 may be configured to generate estimated positions corresponding to one or more objects in the operational environment based on data that may be sparse compared with data that may be generated using one or more other sensors. For example, the neural network 190 may be configured to estimate one or more positions corresponding to objects in an operational environment based on RADAR data as opposed to, for example, LiDAR data. Continuing the example, the neural network 190 may be configured to represent respective positions corresponding to the one or more objects using one or more bounding boxes 174.

Modifications, additions, or omissions may be made to the environment 155 without departing from the scope of the present disclosure. Alternatively, or additionally, the environment 155 may include any number of other components, actions, or inputs that may not be explicitly illustrated or described.

Figure 1C:
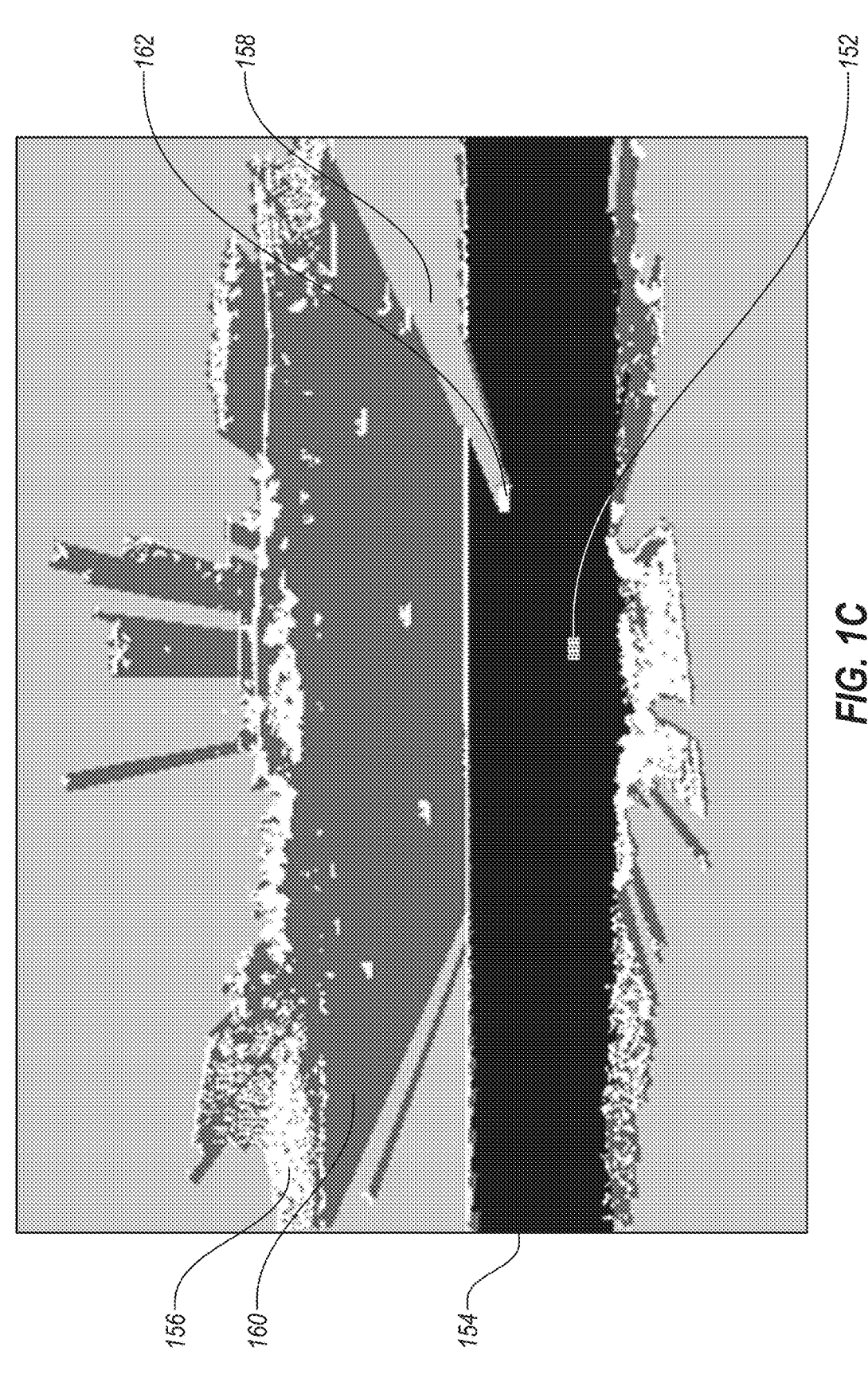
FIG. 1C illustrates an example operational environment associated with the system of FIG. 1A, in accordance with some embodiments of the present disclosure.

FIG. 1C illustrates an example operational environment 150 associated with the system 100 of FIG. 1A, in accordance with some embodiments of the present disclosure. The operational environment 150 may be presented as a top-down view of the operational environment 150 associated with the ego-machine (included in the operational environment 150 as the ego-machine 152). One or more sensors associated with the ego-machine 152 (e.g., the first sensor 110) may generate the data that may be used to generate the top-down view of the operational environment 150 and the different shades of grayscale may illustrate the various portions of the operational environment 150 that may be associated with the current statuses, as described herein. The current statuses may include observed and free current status 154, observed and occupied current status 156, unobserved current status 158, and partially observed current status 160. In some embodiments, an object 162 may obstruct a line of sight of a sensor associated with the ego-machine 152, which may cause a change in the current status disposed beyond the object 162 relative to the ego-machine 152.

In some embodiments, the observed and free freespace label may describe portions of the operational environment that may be viewable using the second sensor 120 and may not include an object based on the first data 112 and/or the object labels annotated into the first data 112. As described herein, the observed portion of the freespace label may be associated with the visibility status and the free portion of the freespace label may be associated with the occupancy status. Alternatively, or additionally, determining the observed and free freespace label may be based on the ray traces from the ego-machine in view of the second sensor 120. For example, the first data 112 generated using the first sensor 110 may include an observation of a viewable area of the operational environment (that may not include an object, based on the object labels corresponding to the first data 112) and a determination may be made relative to the viewable area as to whether the second sensor 120 may observe and/or be capable of observing the viewable area. In instances in which the second sensor 120 is capable of observing the viewable area and no objects are disposed therein, the first data 112 may be annotated with the observed and free freespace label corresponding to the viewable area. In some embodiments, the observed and free freespace label may provide a likely indication of freespace within the operational environment.

For example, as illustrated in FIG. 1C, the observed and free current status 154 may be the solid black portion of the operational environment 150. In some embodiments, the observed and free current status 154 may be adjacent to the ego-machine 152 and/or may be associated with a navigable space relative to the ego-machine 152, as described herein.

In some embodiments, the observed and occupied freespace label may describe portions of the operational environment that may be viewable using the second sensor 120 and may include an object based on the first data 112 and/or the object labels annotated into the first data 112. As described herein, the observed portion of the freespace label may be associated with the visibility status and the occupied portion of the freespace label may be associated with the occupancy status. For example, one or more rays may be traced from the second sensor 120 associated with the ego-machine to a side thereof and may intersect an object (such as a vehicle) that may be included in the first data 112. The ray tracings may be used to determine whether the second sensor 120 may be capable of observing the object. Similar to the observed and open freespace label, the determination may be made relative to the viewable area of the operational environment as to whether the second sensor 120 may observe and/or be capable of observing the viewable area. In instances in which the second sensor 120 is capable of observing the viewable area and an object is disposed therein, the first data 112 may be annotated with the observed and occupied freespace label corresponding to the viewable area. The observed and occupied freespace label may provide an unlikely indication of freespace within the operational environment (e.g., the portion of the first data 112 having the observed and occupied freespace label may not be freespace).

For example, as illustrated in FIG. 1C, the observed and occupied current status 156 may be the solid white portion of the operational environment 150. The observed and occupied current status 156 may be associated with one or more objects detected within the operational environment 150. For example, the object 162 may be a vehicle within the operational environment 150 and thus is illustrated as white indicating the portion of the operational environment 150 associated with the object 162 is the observed and occupied current status 156.

In some embodiments, the unobserved freespace label may describe portions of the operational environment that may be unviewable using the second sensor 120. The unobserved portion of the freespace label may be associated with the visibility status and the occupancy status may be undetermined relative to the second sensor 120. For example, the first sensor 110 may observe and/or the detection module 130 may determine an occupancy status associated with a particular portion of the operational environment as included in the first data 112, and the second sensor 120 may be unable to observe the particular portion. In such instances, the detection module 130 may determine that the first data 112 may be annotated with the unobserved freespace label corresponding to the particular portion. In some embodiments, the unobserved freespace label may apply to portions of the operational environment that may be unobservable using the second sensor 120 and may be observable using the first sensor 110. For example, the first data 112 generated using the first sensor 110 may include data associated with a viewable area of the operational environment (that may or may not include an object, based on the object labels in the first data 112) and a determination may be made relative to the viewable area (e.g., via ray tracing) that the second sensor 120 may not be capable of observing the viewable area. In such instances, the first data 112 may be annotated with the unobserved freespace label corresponding to the viewable area. As such, in some embodiments, the unobserved freespace label may provide little to no indication of the freespace (e.g., the unobserved freespace label may be as equally likely to be freespace or non-freespace) in the operational environment.

For example, as illustrated in FIG. 1C, the unobserved current status 158 may be the light gray portion of the operational environment 150. The unobserved current status 158 may be associated with portions of the operational environment 150 where the view thereof relative to a sensor associated with the ego-machine 152 may be obstructed by one or more objects in the operational environment 150. For example, a line of sight extending from the ego-machine 152 in the direction of the object 162 may result in a frustoconical portion behind the object 162 (relative to the ego-machine 152) where the frustoconical portion may be the unobserved current status 158 (as the view thereof relative to the ego-machine 152 may be obstructed). In general, the unobserved current status 158 may be portions of the operational environment 150 that may be obstructed from view by one or more objects in the operational environment 150 as the unobserved current status 158 may be positioned behind the observed and occupied current status 156 portions of the operational environment 150 relative to the ego-machine 152.

In some embodiments, the partially observed freespace label may describe portions of the operational environment that may be partially viewable using the second sensor 120, such as a partially obstructed view of the operational environment relative to the ego-machine. The partially observed portion of the freespace label may be associated with the visibility status and the occupancy status may be undetermined relative to the second sensor 120. For example, the first sensor 110 may observe and/or the detection module 130 may determine an occupancy status associated with a particular portion of the operational environment as included in the first data 112, and the second sensor 120 may partially observe the particular portion. In such instances, the detection module 130 may determine that the first data 112 may be annotated with the partially observed freespace label corresponding to the particular portion. For example, a particular ray trace emanating from the ego-machine to a first side thereof may pass through a portion of an object (e.g., a window of a vehicle) included in the operational environment, which may provide a variable indication of freespace within the operational environment. The particular ray trace may be used to determine whether the second sensor 120 may be capable of observing the object and/or a portion of the operational environment behind the object relative to the ego-machine. The determination may be made relative to a viewable area of the operational environment as to whether the second sensor 120 may observe and/or be capable of observing the viewable area. For example, in some embodiments, a particular portion of the operational environment may be sufficiently viewable using the second sensor 120 such that a likely indication of freespace within the operational environment may be determined (e.g., an occupancy status associated with the particular portion may be determined). In another example, a particular portion of the operational environment may be insufficiently viewable using the second sensor 120 such that a the partially observed freespace label may be similar to the unobserved freespace label, where there may be little to no indication of the freespace (e.g., an occupancy status associated with the particular portion may be undetermined).

For example, as illustrated in FIG. 1C, the partially observed current status 160 may be the dark gray portion of the operational environment 150. The partially observed current status 160 may be associated with portions of the operational environment 150 where the view thereof relative to a sensor associated with the ego-machine 152 may be partially obstructed by one or more objects in the operational environment 150. For example, the partially observed current status 160 may be associated with portions of the operational environment 150 between two or more observed and occupied current status 156 portions of the operational environment 150, where the two or more observed and occupied current status 156 portions may have differing heights. For example, a curb adjacent to the navigable space may be detected as an observed and occupied current status 156 portion of the operational environment 150 and a second object further from the ego-machine 152 than the curb may be detected as an observed and occupied current status 156 portion, where the second object may have a greater height than the curb. In such instances, a first portion of the operational environment 150 between the curb and the second object may be observed and a second portion of the operational environment 150 between the curb and the second object may be unobserved, as the second portion may be obstructed by the curb, such that the partially observed current status 160 may be applicable to the portion of the operational environment 150 between the curb and the second object.

In some embodiments, the freespace labels and/or the current status associated with the freespace labels (e.g., the visibility status and/or the occupancy status) may be determined using at least the object labels associated with the first data 112, such as an object type associated with the object labels. For example, in instances in which the first data 112 includes an object label identifying a curb (e.g., the object type) on a first side of the ego-machine, the portion of the first data 112 corresponding to the operational environment between the ego-machine and the curb may be annotated with the observed and free freespace label (e.g., the portion of the first data 112 may be freespace).

Alternatively, or additionally, in some embodiments, a surface of the navigable space in the operational environment may be detected using the detection module 130 and/or represented as data points in the first data 112 (e.g., surface data points associated with the surface of the navigable space may be included in the first data 112). In some embodiments, the surface data points in the first data 112 may appear and/or be detected as objects within the operational environment which may be associated with an occupied (e.g., non-freespace) occupancy status. In some embodiments, the surface data points may be filtered out of the first data 112 using the detection module 130 and the corresponding portion of the operational environment represented in the first data 112 may be annotated with the observed and free freespace label (e.g., the portion of the first data 112 corresponding to the surface data points may be freespace).

In these and other embodiments, one or more freespace labels corresponding to the first data 112 may be obtained using one or more of the foregoing methods of annotating the first data 112 with the freespace labels. For example, a particular portion of the operational environment represented in the first data 112 between particular object types (e.g., one or more curbs) may be detected using the detection module 130 as potential freespace, and the detection module 130 removing surface data points that may correspond to the particular portion may contribute a first increased confidence that the particular portion may be freespace. Alternatively, or additionally, the detection module 130 determining the observed and free freespace label may be applicable to the particular portion may contribute a second increased confidence that the particular portion of the operational environment may be freespace.

In these and other embodiments, the occupancy status associated with the freespace labels may be represented as a confidence metric (e.g., a confidence value or a percentage) associated with a likelihood that a particular portion of the operational environment is freespace. In some embodiments, a large confidence value (e.g., greater than 50%) may indicate a likelihood of freespace, a small confidence value (e.g., less than 50%) may indicate a likelihood of non-freespace (e.g., an object may be present), and/or a neutral confidence value (e.g., approximately 50%) may indicate a substantially equal likelihood of freespace or non-freespace (such as may be associated with the unobserved freespace label described herein). In some embodiments, the confidence metric associated with the freespace may be represented on a continuum, where a confidence value further (e.g., either greater or less) from the neutral confidence value may indicate a greater confidence of freespace or non-freespace.

As described herein, the first data 112 may be annotated with the freespace labels once a determination relative to the current status of a particular portion of the operational environment may be made relative to the particular portion.

In some embodiments, the first data 112 may include one or more freespace labels and/or object labels that may provide an indication and/or location of associated freespace and/or objects, respectively, disposed within the operational environment and/or in view of the first sensor 110.

In some embodiments, the freespace labels associated with the first data 112 may be propagated to the second data 122. For example, the second data 122 may be annotated with the freespace labels included in the first data 112 (e.g., as determined using the detection module 130 according to the descriptions provided herein), where the combination of the annotations and the second data 122 may be the freespace annotated data 134. In some embodiments, the freespace annotated data 134 may include the same or similar freespace labels as the freespace labels that may be included in the first data 112. Alternatively, or additionally, the freespace annotated data 134 may include fewer freespace labels relative to the first data 112 as the freespace annotated data 134 may be limited to a viewable area relative to the second sensor 120 via ray tracing, as described herein.

In these and other embodiments, the first data 112 (which may include the freespace labels) may be aligned with the second data 122 such that the propagation of the freespace labels included in the first data 112 to the second data 122 may be aligned within the operational environment relative to the ego-machine and/or the operational environment.

In some embodiments, the first data 112 and the second data 122 may be spatially aligned. For example, the first data 112 may include one or more reference points associated with a particular portion of the operational environment, the second data 122 may include one or more second reference points associated with the particular portion of the operational environment, and the first data 112 may be aligned with the second data 122 by aligning the first reference points with the second reference points. Alternatively, or additionally, the first data 112 and the second data 122 may be temporally aligned. For example, the first data 112 may include one or more first time stamps associated therewith, the second data 122 may include one or more second time stamps associated therewith, and the first data 112 may be aligned with the second data 122 by aligning the first time stamps with the second time stamps. In instances in which the first data 112 is spatially aligned with the second data 122, the first reference points and the second reference points may be obtained relative to a common reference point, such as the origin of the rig coordinate frame relative to the ego-machine described herein. As such, the first reference points and the second reference points may have a common reference point in space (e.g., within the operational environment). In instances in which the first data 112 is temporally aligned with the second data 122, the first time stamps and the second time stamps may be determined using a single clock device, such that the first time stamps and the second time stamps may have a common reference point in time.

In some embodiments, the freespace annotated data 134 may be input into the ML model 140 where the freespace annotated data 134 may be used as training data for the ML model 140. As such, the ML model 140 may be trained using the second data 122 (e.g., RADAR generated data) including one or more freespace labels as determined relative to the first data 112, such that the ML model 140 may be trained to identify freespace within the operational environment with an accuracy comparable to the first data 112 (e.g., non-sparse data generated using a LiDAR device) while using training data generated using the second data 122 (e.g., sparse data generated using a RADAR device). For example, the ML model 140 may be trained to identify freespace in the operational environment by at least correlating the freespace labels included in the first data 112 to corresponding portions of the second data 122 (e.g., the freespace annotated data 134 that may not include the object labels and/or the freespace labels) such that the ML model 140 may identify freespace using a sensor data of the same type as that obtained using the second sensor 120 (e.g., a RADAR device producing sparse data) with a similar accuracy as using sensor data of the same type as that obtained using the first sensor 110 (e.g., a LiDAR device producing non-sparse data).

In some embodiments, the ML model 140 may include any suitable algorithms, computer systems, neural networks, deep learning models, and/or other models that may be configured to analyze one or more characteristics corresponding to input data. In some embodiments of the present disclosure, the ML model 140 may be configured to analyze at least a portion of the operational environment corresponding to freespace located therein based on being trained using the freespace annotated data 134.

In some embodiments, the ML model 140 may output one or more of the confidence metrics related to the probability of an object at a particular location in the operational environment and/or the probability of freespace relative to a particular location in the operational environment (e.g., a predicted occupancy probability). The confidence metrics output may include, but not be limited to, a data file, an interactable graphical display, and/or other forms of data. For example, the ML model 140 may generate output data that may be opened in a software application, that may be remote from the ML model 140. In another example, the ML model 140 may cause a some or all of the confidence metrics to display on a display device, such as directed by a user input. For example, a user may provide input to the ML model 140 to direct the display of the probability of freespace adjacent to the ego-machine. In some embodiments, the probability of freespace may be displayed using one or more colors that may be representative of the probability of freespace, where various shades of color may be used to represent the continuum of the confidence metrics, as described herein.

In some embodiments, the ML model 140 may segment portions of the operational environment, such as into pixel-by-pixel representations, and the ML model 140 may determine the confidence metrics associated with the probability of an object and/or the probability of freespace within the operational environment relative to the segmented portions. For example, the confidence metrics around the ego-machine in the operational environment may be predicted for individual pixels, such that the individual pixels may include an associated confidence metric related to the prediction that an individual pixel may be occupied or free within the operational environment.

In these and other embodiments, the predicted occupancy probability may be represented as a confidence metric (e.g., a confidence value or a percentage) associated with a likelihood that a particular portion of the operational environment is freespace. In some embodiments, a large confidence value (e.g., greater than 50%) may indicate a likelihood of freespace, a small confidence value (e.g., less than 50%) may indicate a likelihood of non-freespace (e.g., an occupied portion of the operational environment), and/or a neutral confidence value (e.g., approximately 50%) may indicate a substantially equal likelihood of freespace or non-freespace (such as may be associated with the unobserved label as described herein). In some embodiments, the confidence metric associated with the freespace may be represented on a continuum, where a confidence value further (e.g., either greater or less) from the neutral confidence value may indicate a greater confidence of freespace or non-freespace.

In some embodiments, the training data for the ML model 140 (e.g., the freespace annotated data 134) may be obtained relative to the operational environment. Alternatively, or additionally, the ML model 140 may be configured to operate (e.g., subsequent to being trained) in the operational environment and/or other environments, where the ego-machine may be configured to operate. For example, the ML model 140 may be trained using data generated within a city environment and may operate thereafter (e.g., subsequent to being trained) in a rural environment. In instances in which the ML model 140 is in an operation mode (e.g., subsequent to being trained), the ML model 140 may use data having the same data type as a data type associated with training the ML model 140. For example, in an operation mode, the ML model 140 may use RADAR data, which may be the same data type (e.g., RADAR data) as the second data 122 generated using the second sensor 120 (e.g., a RADAR device).

In these and other embodiments, the ML model 140 may be trained using the freespace annotated data 134 that includes one or more freespace labels propagated from the first data 112 such that the ML model 140 may obtain the second data 122 and may identify freespace within an operational environment by using the one or more freespace labels, as described herein. As such, the ML model 140 may contribute to navigation of the ego-machine using sensors similar to the second sensor 120 (e.g., a RADAR device) and/or sensor data similar to the second data 122 and/or the freespace annotated data 134 (e.g., RADAR data) that may be less expensive and/or more compact, respectively, compared to other sensors and/or sensor data, such as LiDAR devices and/or a LiDAR point cloud, respectively. As such, the navigation of the ego-machine may be accomplished at a lower cost and/or with sensors (e.g., RADAR devices) that may be more readily available and/or present in vehicles than other sensors (e.g., LiDAR devices).

Modifications, additions, or omissions may be made to the system 100 without departing from the scope of the present disclosure. Alternatively, or additionally, the system 100 may include any number of other components, actions, or inputs that may not be explicitly illustrated or described.

Figure 2:
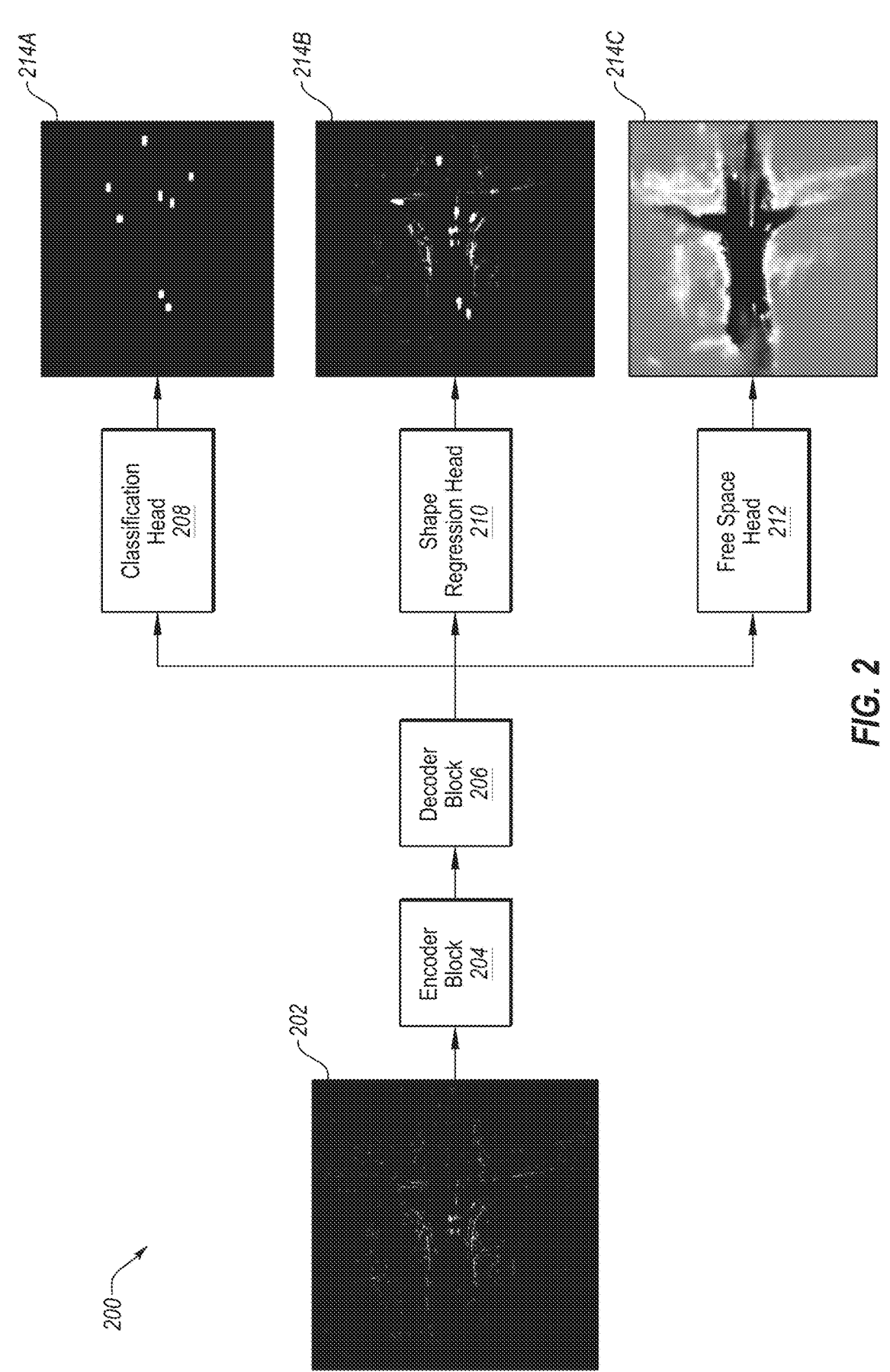
FIG. 2 illustrates an example network architecture used to identify one or more obstacles and/or free space in an environment, according to one or more embodiments of the present disclosure.

FIG. 2 illustrates an example network architecture 200 used to identify one or more obstacles and/or free space in an environment, according to one or more embodiments of the present disclosure. In some embodiments, the network architecture 200 may correspond to a convolutional neural network (CNN) that may be configured to perform one or more operations corresponding to input data 202.

In some embodiments, the input data 202 may include data obtained and/or generated using one or more sensors. For example, the input data 202 may include RADAR data corresponding to an environment. In some embodiments, the input data 202 may be the same as and/or analogous to the second data 122 described and/or illustrated with respect to FIG. 1.

In some embodiments, the network architecture 200 may include an encoder block 204. In some embodiments, the encoder block 204 may include one or more convolutional layers that may be implemented using code and routines that may be configured to perform one or more operations using the input data 202. In some embodiments, the one or more convolutional layers corresponding to the encoder block may enable one or more portions of the CNN to extract one or more features, elements, patterns, and/or portions of input data—e.g., input data 202. For example, the one or more convolutional layers may include one or more sets of filters and/or kernals that may be used to perform one or more mathematical operations using the input data 202. Continuing the example, the mathematical operations, kernals, and/or sets of filters may be used to highlight one or more patterns, features, and/or portions of the input data 202.

Additionally or alternatively, the encoder block 204 may include one or more activation functions that may be configured to introduce non-linearity to the input data 202. In some embodiments, the introduction of non-linearity may increase an ability of the network to model relationships between data that may correspond to the input data 202. In some embodiments, the one or more activation functions may be applied using the input data 202 in conjunction with the one or more operations implemented using the code and routines that may correspond to the one or more convolutional layers. For example, the activation functions may include one or more rectified linear unit (ReLU) activation functions, Sigmoid activation functions, Softmax activation functions, and any other activation function that may increase an ability of the network to model relationships between data included in the input data 202.

In some embodiments, the encoder block 204 may additionally include one or more layers that may be configured to compress and/or reduce one or more spatial dimensions corresponding to the input data 202. In some embodiments, the one or more layers may include convolutional layers, pooling layers, strided convolutions, etc. that may be employed and/or otherwise used to reduce one or more spatial dimensions corresponding to the input data 202.

In some embodiments, the encoder block 204 may be configured to generate resulting data, the resulting data including identified, highlighted, and/or extracted features included in the input data 202. In some embodiments, the encoder block 204 may be configured to pass the resulting data to a decoder block 206.

The decoder block 206 may include one or more deconvolutional layers that may be implemented using code and routines that may be configured to perform one or more operations using the resulting data associated with the encoder block 204. In some embodiments, the one or more deconvolutional layers corresponding to the decoder block 206 may enable one or more portions of the CNN to generate data that resembles the input data 202 while additionally including the one or more features that may have been identified, highlighted, and/or extracted using one or more operations corresponding to the encoder block 204.

In some embodiments, the one or more deconvolutional layers may include one or more sets of filters and/or kernals that may be configured to perform one or more mathematical operations (e.g., transposed convolutions) using the input data 202. Continuing the example, the one or more sets of filters and/or kernals may be configured to reconstruct a dataset resembling the input data 202 that may additionally include highlighted and/or extracted features that may have been identified using the encoder block 204. In some embodiments, the decoder block 206 may be configured to pass the reconstructed dataset to one or more network heads—e.g., a classification head 208, the shape regression head 210, and/or the free space head 212. In some embodiments, the one or more network heads may be configured to perform one or more operations using the reconstructed dataset.

The classification head 208 may include one or more sub-networks and/or branches corresponding to the network architecture 200 that may be configured to identify and/or generate probabilities corresponding to the output data. For example, in the context of detecting one or more objects corresponding to the environment, the classification head 208 may be configured to identify and/or determine one or more probabilities corresponding to the reconstructed dataset, the one or more probabilities indicating a probability that data associated with the reconstructed dataset may indicate a presence of one or more objects. In some embodiments, the classification head 208 may generate output data 214A that may indicate a presence or absence of one or more objects.

The shape regression head 210 may include one or more sub-networks and/or branches corresponding to the network architecture 200 that may be configured to generate output data 214B. The output data 214B including one or more bounding boxes that may correspond to one or more objects identified corresponding to the output data 214A. The one or more bounding boxes indicating estimated positions corresponding to the one or more objects that may have been identified corresponding to the output data 214A.

The free space head 212 may include one or more sub-networks and/or branches corresponding to the network architecture 200 that may be configured to generate, identify, and/or determine one or more probabilities that data corresponding to the output data 214 may indicate free space or occupied space. In some embodiments, the free space head 212 may generate output data 214C, where the output data 214C may be used to generate a heat map depicting one or more classifications corresponding to the output data 214C. In some embodiments, the one or more classifications may include "observed and free," "observed and occupied," "unobserved," and "partially observed." In these and other embodiments, the output data 214C that may be generated using the free space head 212 may include one or more classifications such as those described, for example, with respect to FIG. 1C.

In some embodiments, one or more loss functions may be associated with the one or more heads (e.g., the classification head 208, the shape regression head 210, and/or the free space head 212). The loss functions may be used to determine and/or quantify a difference or an error between a predicted output and a true or expected output. In some embodiments, the one or more loss functions may be used to determine one or more errors corresponding to output data 214A, 214B, and/or 214C individually and/or the total loss corresponding to all of the output data 214. In some embodiments, the loss functions may include cross-entropy loss functions, mean squared error loss functions, divergence loss functions, and/or other loss functions that may be configured to determine errors associated with output data 214.

For example, the classification head 208 may use a cross-entropy loss function, the shape regression head 210 may use an L1 loss function, and the free space head 212 may use an inverse sensor model loss function. Continuing the example, losses corresponding to the classification head 208, the shape regression head 210, and the free space head 212 may be combined using Bayesian learned weights. Further continuing the example, by combining the losses in this manner, tasks corresponding to each of the heads may be trained individually without affecting an overall accuracy of predictions corresponding to the CNN.

In some embodiments, the CNN corresponding to the network architecture 200 may be configured to use the one or more loss functions to decrease one or more errors corresponding to the one or more loss functions. In some embodiments, the CNN may iteratively adjust one or more parameters corresponding to the neural network based on the one or more loss functions to decrease the one or more errors under a particular threshold. In some embodiments, the particular threshold may be determined based on one or more heuristic analyses. In some embodiments, the ground truth that may be used to compare output data corresponding to the neural network 190 may include the freespace annotated data 134 as described further in the present disclosure, such as, for example, with respect to FIG. 1A.

A depiction of the example network architecture 200 may be described and/or illustrated with respect to Table (1).

TABLE 1

| Layer | Layer description | Input | Output dimensions |
|---|---|---|---|
| Inputs: | | | |
| input | Input RADAR data | — | 5 × 800 × 800 |
| Encoder: | | | |
| 1 | conv (7 × 7), ReLU | input | 64 × 400 × 400 |
| 2a | conv (3 × 3), ReLU | 1 | 64 × 400 × 400 |
| 2b | conv (3 × 3), ReLU | 2a | 64 × 400 × 400 |
| 3a | conv (3 × 3), ReLU | 2b | 64 × 400 × 400 |
| 3b | conv (3 × 3), ReLU | 3a | 64 × 400 × 400 |
| 4a | conv (3 × 3), ReLU | 3b | 128 × 100 × 100 |
| 4b | conv (3 × 3), ReLU | 4a | 128 × 100 × 100 |
| 4c | conv (3 × 3), ReLU | 4b | 128 × 100 × 100 |
| 4d | conv (3 × 3), ReLU | 4c | 128 × 100 × 100 |
| 5a | conv (3 × 3), ReLU | 4d | 256 × 50 × 50 |
| 5b | conv (3 × 3), ReLU | 5a | 256 × 50 × 50 |
| 5c | conv (3 × 3), ReLU | 5b | 256 × 50 × 50 |
| 5d | conv (3 × 3), ReLU | 5c | 256 × 50 × 50 |
| 6a | conv (3 × 3), ReLU | 5d | 512 × 50 × 50 |
| 6b | conv (3 × 3), ReLU | 6a | 512 × 50 × 50 |
| 6c | conv (3 × 3), ReLU | 6b | 512 × 50 × 50 |
| 6d | conv (3 × 3), ReLU | 6c | 512 × 50 × 50 |
| Decoder: | | | |
| freespace_output | deconv (4 × 4), ReLU | 6d | 2 × 400 × 400 |
| regression_output | deconv (4 × 4), ReLU | 6d | 6 × 200 × 200 |
| class_output | deconv (4 × 4), ReLU | 6d | 4 × 200 × 200 |

Table (1) details an example network architecture that may correspond to network architecture 200. The left-hand side of the table outlines different inputs corresponding to respective layers of the neural network. The respective layers of the network corresponding to respective rows in Table (1). Further, individual rows indicate a corresponding description of the layer. For example, the first row under the heading "Encoder" in Table (1) includes information corresponding to a convolutional layer, 7×7 kernals, and an ReLU activation function that receives input RADAR data and generates output data including different spatial dimensions as compared with the input RADAR data.

As depicted in Table (1), the first row is followed by four groupings of four layers each, where individual groupings increase a number of filters and decrease spatial dimensions associated with the input data. For example, the four groupings may double the number of filters by two, while dividing a resolution corresponding to spatial dimensions associated with the input data in half. For example, the first grouping includes four layers with output dimensions of 64×200×200, the second grouping includes four layers with output dimensions of 128×100×100, the third grouping includes four layers with output dimensions of 256×50×50, and the fourth grouping includes four layers with output dimensions of 512×50×50.

Further, as depicted in Table (1), the decoder includes deconvolution layers with 4×4 kernals and one or more corresponding ReLU activation functions. The layers associated with the deconvolution layers may output data that may be used by one or more network heads (e.g., the classification head 208, the shape regression head 210, and/or the free space head 212) to generate output data 214.

While the example network architecture 200 is described as a CNN with one or more network heads, it should be understood that one or more other network architectures and/or combinations of network architectures corresponding to ML models, neural networks, Deep Neural Networks (DNNs), CNNs, Recurrent Neural Networks (RNNs), etc. may be capable of performing the operations described in the present disclosure. For example, one or more other ML models may be configured to perform one or more operations corresponding to input data (e.g., first data 112 and/or second data 122) to determine, identify, and/or classify one or more areas as free space in an environment—e.g., freespace 132 as described, for example, with respect to FIG. 1.

Modifications, additions, or omissions may be made to the network architecture 200 without departing from the scope of the present disclosure. Alternatively, or additionally, the example network architecture 200 may include any number of other layers, networks, network heads, loss functions, inputs, outputs, etc. that may not be explicitly illustrated or described.

FIG. 3 illustrates an example method 300 for freespace detection using an ML model, according to one or more embodiments of the present disclosure. Each block of the method 300, described herein, may comprise a computing process that may be performed using any combination of hardware, firmware, and/or software. For instance, various functions may be carried out by a processor executing instructions stored in memory. The method 200 may also be embodied as computer-usable instructions stored on computer storage media. The method 200 may be provided by a standalone application, a service or hosted service (standalone or in combination with another hosted service), or a plug-in to another product, to name a few. In addition, the method 200 is described, by way of example, with respect to the system 100 of FIG. 1A. However, these methods may additionally or alternatively be executed by any one system, or any combination of systems, including, but not limited to, those described herein. In these and other embodiments, one or more operations of the method 200 may be performed by one or more computing devices, such as that described in further detail below with respect to FIG. 4.

The method 300 may include, at block B302, obtaining first data having one or more object labels that may be individually associated with one or more objects in an operational environment. In some embodiments, the one or more object labels may identify the one or more objects.

At block B304, freespace within the operational environment may be identified based at least on the first data in view of the one or more object labels. In some embodiments, the first data may be annotated with one or more freespace labels that may correspond to the freespace. In some embodiments, the freespace may indicate an area of the operational environment that may be navigable for an ego-machine. In some embodiments, identifying the freespace may include removing one or more points from the first data that may correspond to a surface of the area that may be navigable within the operational environment. In some embodiments, the annotation of the first data with the one or more freespace labels may be performed by a user and/or by user review. For example, the one or more freespace labels may be automatically determined and/or the first data may be automatically annotated with the one or more freespace labels and a user may review the one or more freespace labels and/or may perform adjustments to the one or more freespace labels to improve the accuracy thereof.

At block B306, a viewable area in the operational environment may be determined relative to a second sensor. The viewable area may be determined by tracing one or more rays from the second sensor within a field of view of the second sensor relative to the first data.

At block B308, freespace annotated data may be generated by propagating the one or more freespace labels from the first data to second data obtained using the second sensor corresponding to the viewable area. In some embodiments, the first data and the second data may be obtained at substantially the same time. For example, in instances in which the first sensor obtains the first data at a first time, the second sensor may obtain the second data at the first time, such that both the first data and the second data may be obtained at a particular time and/or at a particular location. In some embodiments, the first data and the second data may be obtained relative to a common reference point, such as relative to the ego-machine in a rig coordinate frame, where a center point of the ego-machine may be substantially the origin of the rig coordinate frame. In these and other embodiments, the second data may be arranged to correspond with the first data (e.g., temporally and/or spatially) prior to the propagation of the one or more freespace labels from the first data to the second data.

In some embodiments, the first data may be a LiDAR point cloud generated using a first sensor, that may be a LiDAR device. In some embodiments, the second data may be RADAR data and the second sensor may be a RADAR device. Alternatively, or additionally, the first sensor and/or the second sensor may include multiple devices that may or may not be homogenous. For example, the first sensor may include one or more of a LiDAR device, a camera device, an infrared device, and/or other devices (e.g., ranging devices) that may obtain data relative to the operational environment that may be used in conjunction with navigation of the ego-machine.

In some embodiments, the one or more freespace labels may be determined based on at least a current status of the operational environment. In some embodiments, the current status may include a visibility status. Alternatively, or additionally, the current status may include an occupancy status.

At block B310, the freespace annotated data may be input into an ML model as ground truth data that may be used to train the ML model to detect the freespace using the second data.

Modifications, additions, or omissions may be made to the method 200 without departing from the scope of the present disclosure. For example, in some embodiments, a predicted occupancy probability may be obtained from the ML model. The predicted occupancy probability may be associated with one or more locations within the operational environment and/or may represent a likelihood of the one or more locations to be freespace or occupied by an object. In some embodiments, the predicted occupancy probability may be associated with a segmented representation of the one or more locations within the operational environment. For example, the one or more locations may include a pixel-by-pixel representation (e.g., in the first data and/or the second data) and the pixels may individually include a predicted occupancy probability.

Although illustrated as discrete blocks, various blocks of the method 300 may be divided into additional blocks, combined into fewer blocks, or eliminated, depending on the desired implementation.

Example Autonomous Vehicle

Figure 4A:
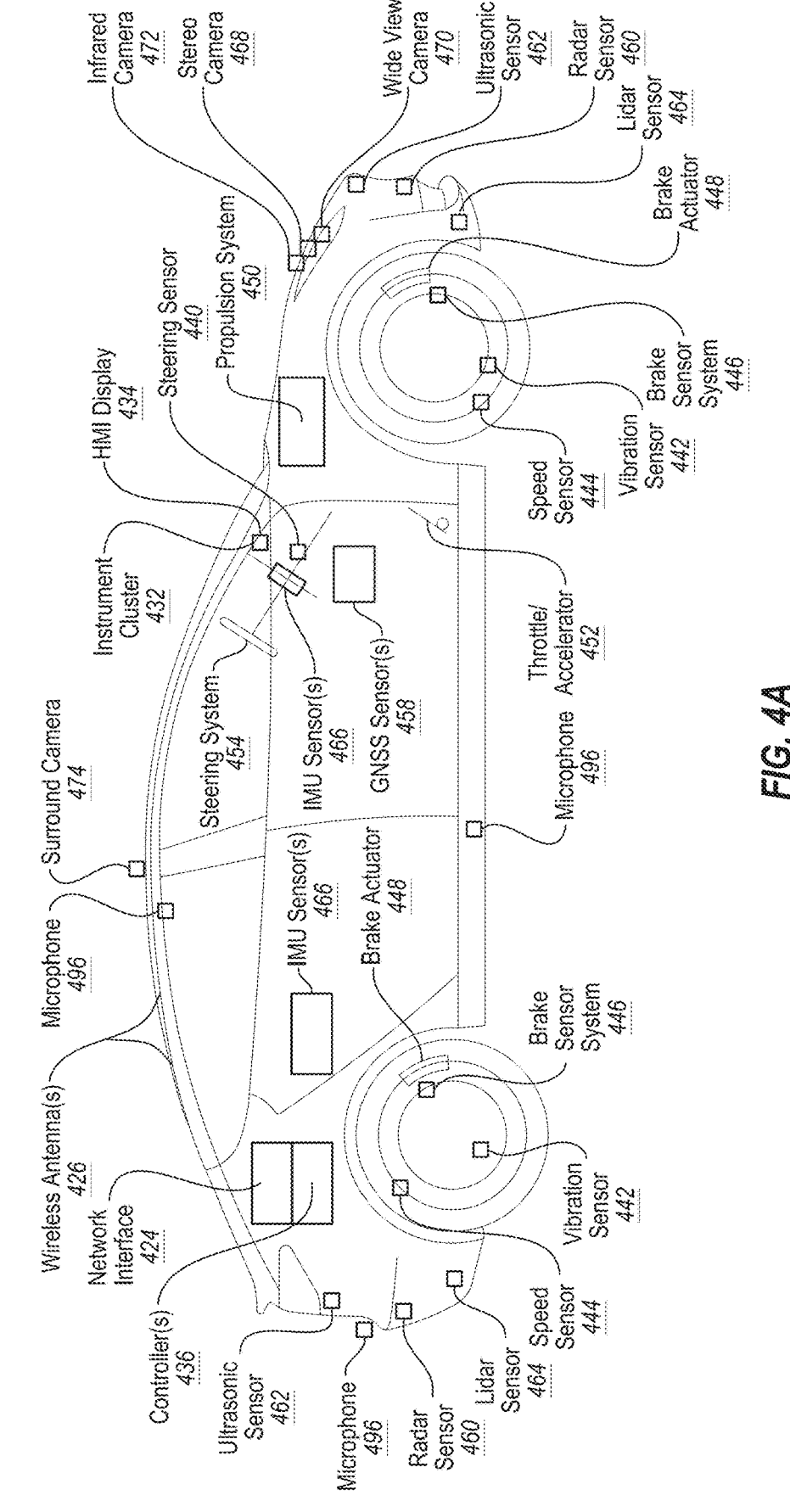
FIG. 4A is an illustration of an example autonomous vehicle, in accordance with some embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. The vehicle 400 may be capable of functionality in accordance with one or more of Level 1-Level 5 of the autonomous driving levels. For example, the vehicle 400 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 400 or other machine, such as being fully autonomous, being highly autonomous, being conditionally autonomous, being partially autonomous, providing assistive autonomy, being semi-autonomous, being primarily autonomous, or other designation.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more CPU(s), system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators

448, to operate the steering system 454 via one or more steering actuators 456, and/or to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) 446 (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the location of the vehicle 400, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424, which may use one or more wireless antenna(s) 426 and/or modem(s) to communicate over one or more networks. For example, the network interface 424 may be capable of communication over LTE, WCDMA, UMTS, GSM, CDMA2000, etc. The wireless antenna(s) 426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
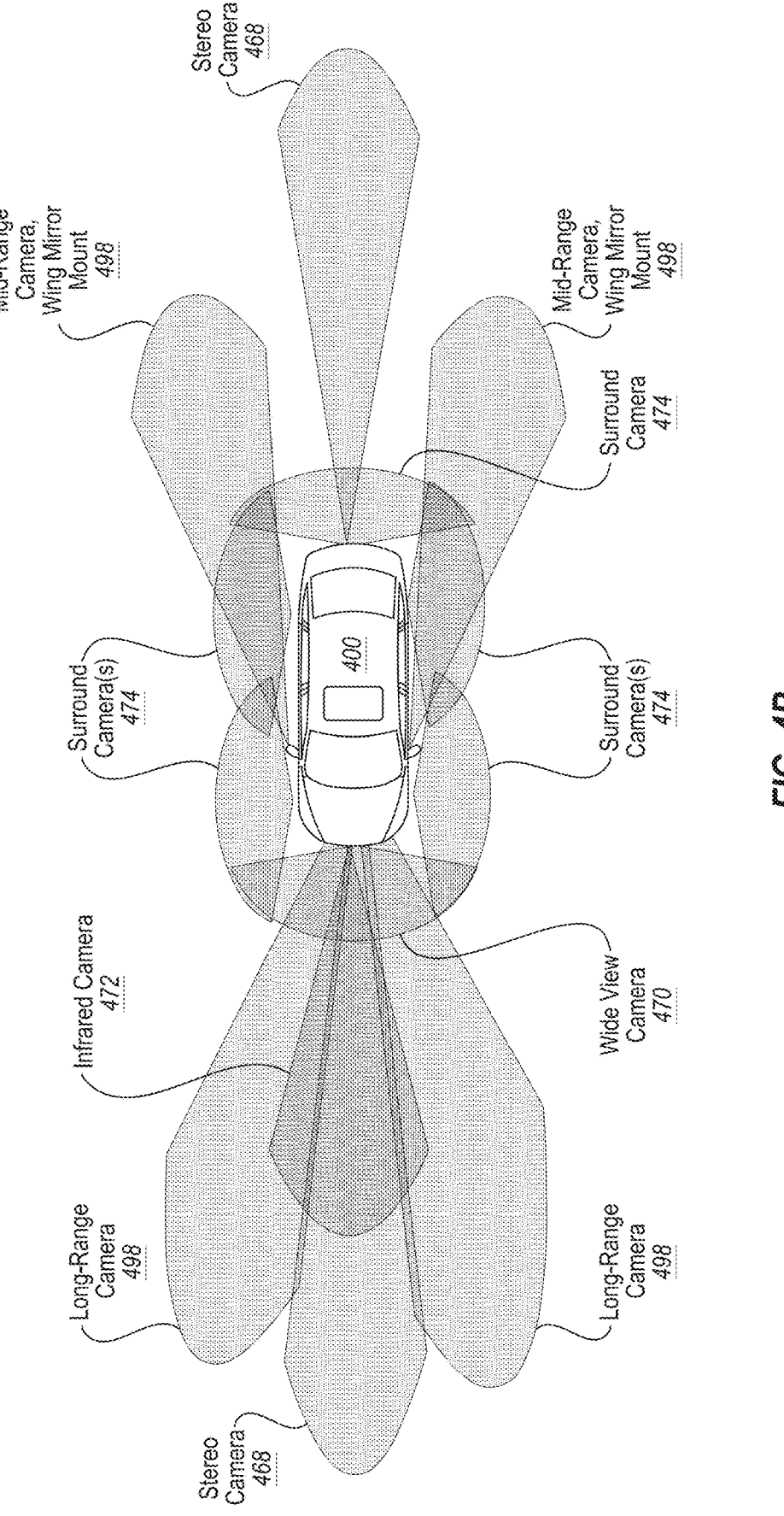
FIG. 4B is an example of camera locations and fields of view for the example autonomous vehicle of FIG. 4A, in accordance with some embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 400 (e.g., front-facing cameras) may be used for surround view, to help identify forward-facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that include portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned to on the vehicle 400. The surround camera(s) 474 may include wide-view camera(s) 470, fisheye camera(s), 360-degree camera(s), and/or the like. For example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround-view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Figure 4C:
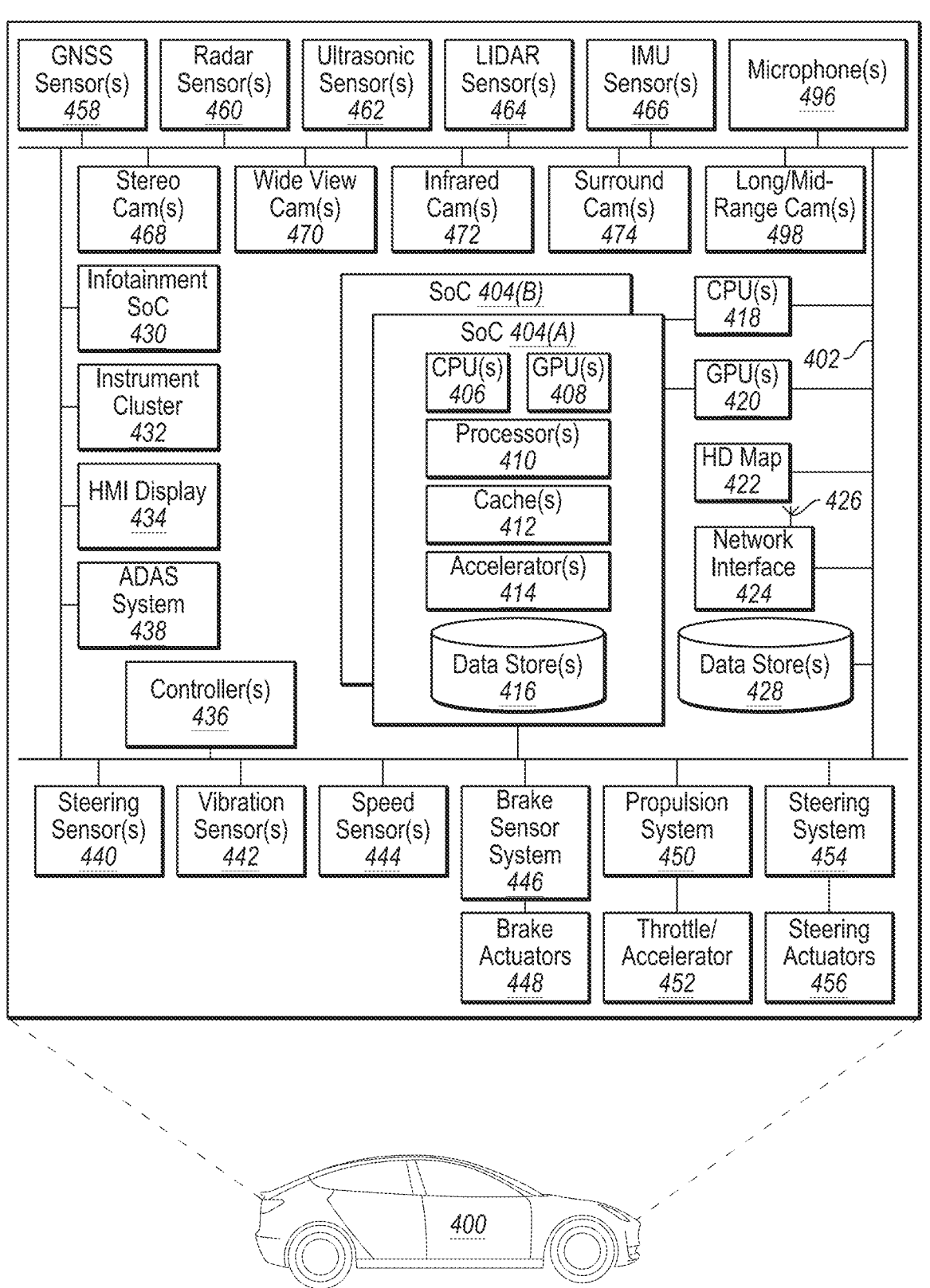
FIG. 4C is a block diagram of an example system architecture for the example autonomous vehicle of FIG. 4A, in accordance with some embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C is illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400 and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use compute application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting, and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR CORES for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected to both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving.

The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to processed RADAR. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 416 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe-stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. An in-cabin monitoring camera sensor is preferably monitored by a neural network running on another instance of the Advanced SoC, configured to identify in-cabin events and respond accordingly. In-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and active doing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always-on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, that use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s)

418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include a SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428, which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458. The GNSS sensor(s) 458 (e.g., GPS, assisted GPS sensors, differential GPD (DGPS) sensors, etc.), to assist in mapping, perception, occupancy grid generation, and/or path planning functions. Any number of GNSS sensor(s) 458 may be used, including, for example and without limitation, a GPS using a USB connector with an Ethernet to Serial (RS-232) bridge.

The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data, in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 400 surrounding at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 100 m, with an accuracy of 2 cm-3 cm, and with support for a 100 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for lowreflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include a SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjust the vehicle speed to maintain a safe distance from vehicles ahead. Lateral ACC performs distance keeping, and advises the vehicle 400 to change lanes when necessary. Lateral ACC is related to other ADAS applications such as LCA and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 400), while the I2V communication concept provides information about traffic further ahead. CACC systems may include either or both I2V and V2V information sources. Given the information of the vehicles ahead of the vehicle 400, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane. BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s).

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network that is trained and thus reduces the risk of false positives, as described herein.

The vehicle 400 may further include the infotainment SoC 430 (e.g., an in-vehicle infotainment system (IVI)). Although illustrated and described as an SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 400. For example, the infotainment SoC 430 may include radios, disk players, navigation systems, video players, USB and Bluetooth connectivity, carputers, in-car entertainment, Wi-Fi, steering wheel audio controls, hands-free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe-stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
FIG. 4D is a system diagram for communication between cloud-based server(s) and the example autonomous vehicle of FIG. 4A, in accordance with some embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced road work. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 5:
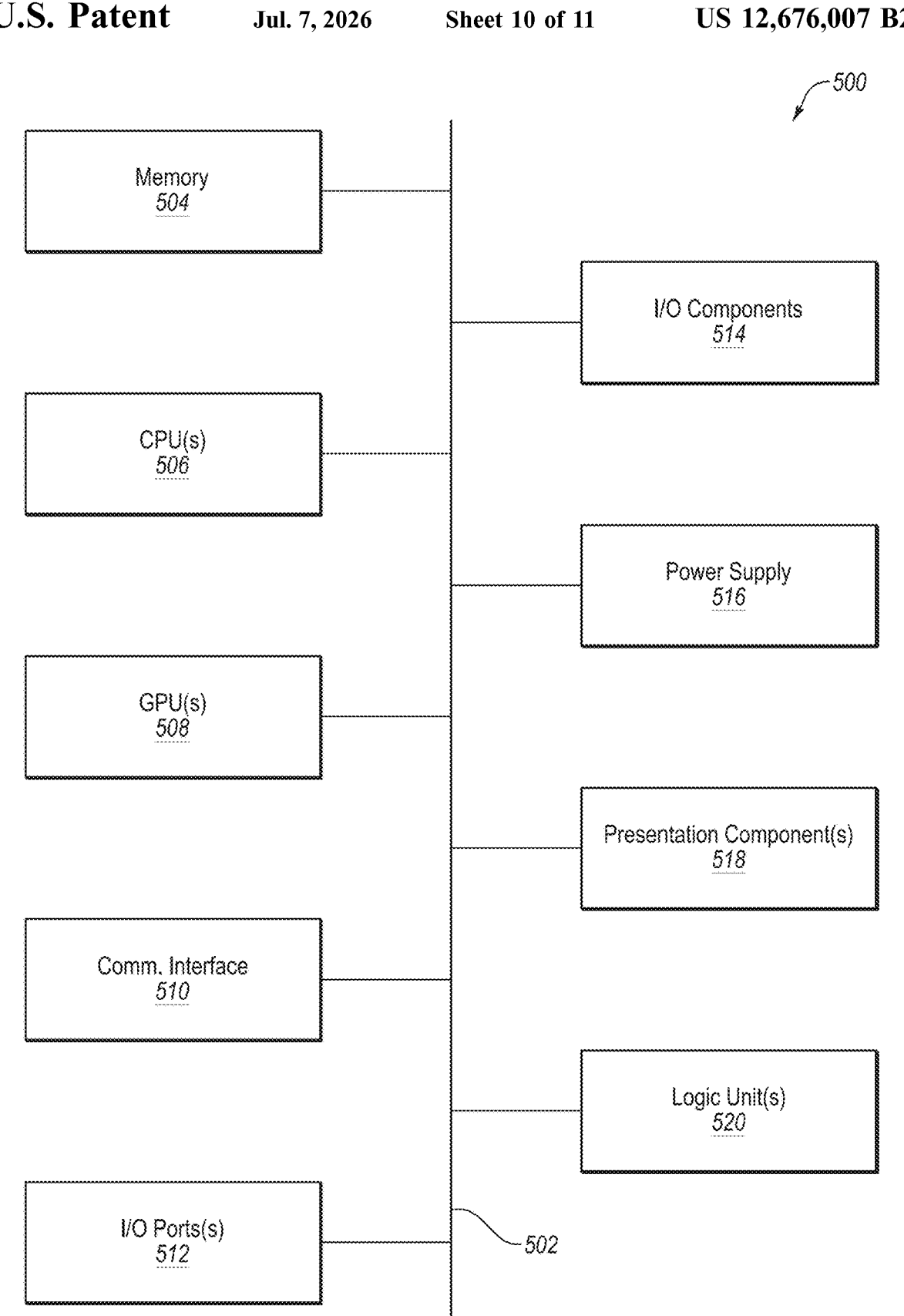
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point, connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMS), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, include wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

Example Data Center

Figure 6:
FIG. 6 is a block diagram of an example data center suitable for use in implementing some embodiments of the present disclosure.

FIG. 6 illustrates an example data center 600 that may be, used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-616(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 600. In at least one embodiment, trained or deployed machine learning models corresponding to one or more neural networks may be used to infer or predict information using resources described in the present disclosure with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment- and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   obtaining sensor data of a first sensor modality corresponding to an operational environment, the sensor data generated using one or more sensors associated with an ego-machine; and
   identifying, using a machine learning model and the sensor data, freespace information indicating one or more portions of the operational environment that is navigable using the ego-machine,
   wherein the machine learning model was previously trained at least by:
      propagating one or more freespace labels from training data of a second sensor modality to training data of the first sensor modality to obtain one or more second freespace labels corresponding to the training data of the first sensor modality; and
      updating one or more parameters of the machine learning model using the training data of the first sensor modality and the one or more second freespace labels.

2. The method of claim 1, wherein the sensor data is generated using one or more RADAR sensors.

3. The method of claim 1, further comprising:
   performing one or more operations using the ego-machine based at least on the identified freespace information.

4. The method of claim 1, wherein the sensor data is obtained relative to the ego-machine in a rig coordinate frame.

5. The method of claim 1, further comprising:
   obtaining, from the machine learning model, a predicted occupancy probability associated with one or more locations within the operational environment.

6. The method of claim 5, wherein the predicted occupancy probability is segmented into a pixel-by-pixel representation of the one or more locations within the operational environment.

7. A computing system comprising:

a first sensor that generates first data, the first data including one or more freespace labels corresponding to freespace in an operational environment, the freespace indicating an area of the operational environment that is navigable for an ego-machine;

a second sensor that generates second data, the second data annotated with the one or more freespace labels propagated from the first data; and a machine learning model that is trained using the second data including the one or more freespace labels to detect the freespace.

8. The computing system of claim 7, wherein a viewable area in the operational environment is determined relative to the second sensor by tracing one or more rays from the second sensor within a field of view of the second sensor relative to the first data.

9. The computing system of claim 7, wherein the second data is arranged to align with the first data prior to propagating the one or more freespace labels from the first data to the second data.

10. The computing system of claim 7, wherein the first data is a LiDAR point cloud obtained using a LiDAR device, the second data is RADAR data, and the second sensor includes a RADAR device.

11. The computing system of claim 7, wherein annotating the first data to obtain the one or more freespace labels is performed at least by user review.

12. The computing system of claim 7, wherein the second data is arranged to correspond with the first data prior to propagating the one or more freespace labels from the first data to the second data.

13. The computing system of claim 7, wherein the one or more freespace labels are determined based on at least a current status of the operational environment.

14. The computing system of claim 13, wherein the current status of the one or more freespace labels includes at least one of a visibility status or an occupancy status.

15. The computing system of claim 7, wherein the computing system comprises one or more of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

16. A processor comprising processing circuitry to perform operations comprising:

obtaining sensor data of a first sensor modality corresponding to an operational environment, the sensor data generated using one or more sensors associated with an ego-machine;

identifying, using a machine learning model, freespace corresponding to the sensor data generated using one or more sensors, wherein the machine learning model was previously trained at least by:

propagating one or more freespace labels from training data of a second sensor modality to training data of the first sensor modality to obtain one or more second freespace labels corresponding to the training data of the first sensor modality; and updating one or more parameters of the machine learning model using the training data of the first sensor modality and the one or more second freespace labels.

17. The processor of claim 16, wherein the sensor data is generated using one or more RADAR sensors.

18. The processor of claim 16, the operations further comprising:

performing one or more operations using the ego-machine based at least on the identified freespace.

19. The processor of claim 16, wherein the data is obtained relative to the ego-machine in a rig coordinate frame.

* * * * *